US010818140B2

(12) United States Patent
Halvorson et al.

(10) Patent No.: US 10,818,140 B2
(45) Date of Patent: Oct. 27, 2020

(54) GAMING SYSTEM AND METHOD PROVIDING PERSISTENT INDICATOR AWARDS

(71) Applicant: ADP GAUSELMANN GMBH, Espelkamp (DE)

(72) Inventors: Michael Charles Halvorson, Las Vegas, NV (US); Josef Alexander Hartl, Las Vegas, NV (US)

(73) Assignee: ADP GAUSELMANN GMBH, Espelkamp (DE)

(*) Notice: Subject to any disclaimer, the term of this patent is extended or adjusted under 35 U.S.C. 154(b) by 0 days.

(21) Appl. No.: 16/366,849

(22) Filed: Mar. 27, 2019

(65) Prior Publication Data

US 2020/0312094 A1 Oct. 1, 2020

(51) Int. Cl.
*G06F 17/00* (2019.01)
*G07F 17/32* (2006.01)

(52) U.S. Cl.
CPC ...... *G07F 17/3267* (2013.01); *G07F 17/3213* (2013.01); *G07F 17/3244* (2013.01)

(58) Field of Classification Search
CPC ............. G07F 17/3267; G07F 17/3244; G07F 17/3213
See application file for complete search history.

(56) References Cited

U.S. PATENT DOCUMENTS 5,833,537 A 11/1998 Barrie
5,980,384 A 11/1999 Barrie
(Continued)

FOREIGN PATENT DOCUMENTS

AU 2014903132 8/2014
AU 2015210489 A1 2/2016
(Continued)

OTHER PUBLICATIONS

Aristocrat Technologies Australia Pty Ltd., "Lightning Link", Retrieved from the Internet on Oct. 25, 2018: http://www.aristocrat-us.com/lightning-link, p. 1.

*Primary Examiner* — Dmitry Suhol
*Assistant Examiner* — Carl V Larsen
(74) *Attorney, Agent, or Firm* — Resolute Legal PLLC

(57) ABSTRACT

The present disclosure provides systems and processes for gaming. A gaming system consistent with the present disclosure provides a game feature involving multiple rounds. For the individual rounds of the game feature, the gaming system can display randomly determined combinations of game symbols at symbol display areas and determine awards corresponding to the winning combinations. Additionally, for the individual rounds of the game feature, the gaming system can display persistent game indicators at the symbol display areas. The game symbols may be replaced from round-to-round of the game feature. The persistent game indicators are held in the symbol display areas from round-to-round of the game feature such that the quantity of symbol display areas including the persistent game indicators accumulate during the game feature. After the last round of the game feature, the gaming system can evaluate the displayed persistent game indicators and determine whether the accumulated persistent game indicators correspond to a game award.

20 Claims, 22 Drawing Sheets

(56) References Cited

U.S. PATENT DOCUMENTS

| | | | |
|---|---|---|---|
| 6,159,095 A | 12/2000 | Frohm et al. | |
| 6,186,894 B1 | 2/2001 | Mayeroff | |
| 6,251,013 B1 | 6/2001 | Bennett | |
| 6,290,600 B1 | 9/2001 | Glasson | |
| 6,311,976 B1 | 11/2001 | Yoseloff et al. | |
| 6,319,124 B1 | 11/2001 | Baerlocher et al. | |
| 6,394,902 B1 | 5/2002 | Glavich et al. | |
| 6,517,432 B1 | 2/2003 | Jaffe | |
| 6,558,254 B2 | 5/2003 | Baerlocher et al. | |
| 6,561,900 B1 | 5/2003 | Baerlocher et al. | |
| 6,632,140 B2 | 10/2003 | Berman et al. | |
| 6,692,356 B2 | 2/2004 | Baerlocher et al. | |
| 6,780,109 B2 | 8/2004 | Kaminkow | |
| 6,866,583 B2 | 3/2005 | Glavich et al. | |
| 6,896,617 B2 | 5/2005 | Daly | |
| 6,921,335 B2 | 7/2005 | Rodgers et al. | |
| 7,052,395 B2 | 5/2006 | Glavich et al. | |
| 7,137,888 B2 | 11/2006 | Glavich et al. | |
| 7,384,334 B2 | 6/2008 | Glavich et al. | |
| 7,393,277 B2 | 7/2008 | Jackson | |
| 7,396,282 B2 | 7/2008 | Gauselmann | |
| 7,399,225 B2 | 7/2008 | Kaminkow | |
| 7,736,223 B2 | 6/2010 | Pace | |
| 7,749,071 B2 | 7/2010 | Marks et al. | |
| 7,794,320 B2 | 9/2010 | Baerlocher et al. | |
| 7,846,018 B2 | 12/2010 | Baerlocher | |
| 7,922,573 B2 | 4/2011 | Baerlocher et al. | |
| 7,927,204 B2 | 4/2011 | DeBrabander, Jr. et al. | |
| 7,959,504 B2 | 6/2011 | Baumgartner et al. | |
| 8,002,626 B2 | 8/2011 | Englman | |
| 8,137,180 B2 | 3/2012 | Thomas et al. | |
| 8,152,627 B2 | 4/2012 | Berman et al. | |
| 8,162,741 B2 | 4/2012 | Wadleigh et al. | |
| 8,197,330 B2 | 6/2012 | Englman et al. | |
| 8,231,460 B2 | 7/2012 | Gauselmann | |
| 8,272,944 B2 | 9/2012 | Englman et al. | |
| 8,337,300 B2 | 12/2012 | Bowers et al. | |
| 8,357,041 B1 | 1/2013 | Saunders | |
| 8,382,571 B2 | 2/2013 | Marks et al. | |
| 8,469,793 B2 | 6/2013 | Visser | |
| 8,475,259 B2 * | 7/2013 | Weber | G07F 17/34 463/20 |
| 8,491,375 B2 | 7/2013 | Low | |
| 8,506,380 B2 | 8/2013 | Hughes et al. | |
| 8,517,814 B2 | 8/2013 | Visser | |
| 8,574,061 B2 | 11/2013 | Marks et al. | |
| 8,585,485 B2 | 11/2013 | Guinn | |
| 8,608,543 B2 | 12/2013 | Cuddy et al. | |
| 8,622,809 B1 | 1/2014 | Arora et al. | |
| 8,814,658 B2 | 8/2014 | Marks et al. | |
| 8,840,457 B1 | 9/2014 | Basallo et al. | |
| 9,011,233 B2 | 4/2015 | Ryan | |
| 9,129,492 B2 | 9/2015 | Marks et al. | |
| 9,153,090 B2 | 10/2015 | Pacey et al. | |
| 9,177,448 B2 | 11/2015 | Caputo et al. | |
| 9,214,067 B2 | 12/2015 | Basallo et al. | |
| 9,218,705 B2 | 12/2015 | Taylor | |
| 9,230,409 B2 | 1/2016 | Pawloski | |
| 9,449,470 B2 | 9/2016 | Baerlocher et al. | |
| 9,704,342 B2 | 7/2017 | Aoki et al. | |
| 9,710,998 B2 | 7/2017 | Nelson et al. | |
| 9,786,116 B2 | 10/2017 | Saunders | |
| 9,805,542 B2 | 10/2017 | Rodgers et al. | |
| 9,805,553 B2 | 10/2017 | Zielinski et al. | |
| 9,852,574 B2 | 12/2017 | Zoltewicz et al. | |
| 9,928,691 B2 | 3/2018 | Olive | |
| 2001/0054794 A1 | 12/2001 | Cole et al. | |
| 2002/0043759 A1 | 4/2002 | Vancura | |
| 2002/0045474 A1 | 4/2002 | Singer et al. | |
| 2003/0022712 A1 | 1/2003 | Locke | |
| 2004/0009808 A1 | 1/2004 | Gauselmann | |
| 2004/0043809 A1 | 3/2004 | Gomez et al. | |
| 2004/0048646 A1 | 3/2004 | Visocnik | |
| 2004/0053673 A1 | 3/2004 | Mishra | |
| 2004/0204228 A1 * | 10/2004 | Walker | G07F 17/3244 463/20 |
| 2005/0130737 A1 | 6/2005 | Englman et al. | |
| 2005/0159208 A1 | 7/2005 | Pacey | |
| 2006/0058097 A1 | 3/2006 | Berman et al. | |
| 2006/0068892 A1 | 3/2006 | Gomez et al. | |
| 2006/0154717 A1 | 7/2006 | Jackson | |
| 2006/0189377 A1 | 8/2006 | Gomez et al. | |
| 2008/0045302 A1 | 2/2008 | Low | |
| 2008/0248865 A1 | 10/2008 | Tedesco et al. | |
| 2009/0131150 A1 | 5/2009 | Iverson et al. | |
| 2009/0137311 A1 | 5/2009 | Iverson et al. | |
| 2009/0221353 A1 | 9/2009 | Joung | |
| 2010/0029381 A1 * | 2/2010 | Vancura | G07F 17/3244 463/30 |
| 2010/0120489 A1 | 5/2010 | Meyer | |
| 2010/0190542 A1 | 7/2010 | Mizue | |
| 2010/0197377 A1 | 8/2010 | Aoki et al. | |
| 2010/0304833 A1 * | 12/2010 | Berman | G07F 17/34 463/20 |
| 2011/0003627 A1 | 1/2011 | Nicely et al. | |
| 2011/0034234 A1 | 2/2011 | Berman et al. | |
| 2011/0111829 A1 * | 5/2011 | Joung | G07F 17/3265 463/20 |
| 2011/0117989 A1 | 5/2011 | Kennedy et al. | |
| 2011/0136565 A1 | 6/2011 | Low | |
| 2011/0230251 A1 | 9/2011 | Nicely et al. | |
| 2012/0231868 A1 | 9/2012 | Guinn | |
| 2012/0295688 A1 | 11/2012 | Watkins et al. | |
| 2013/0143639 A1 | 6/2013 | Nakamura | |
| 2014/0018146 A1 | 1/2014 | Zielinski et al. | |
| 2014/0039693 A1 | 2/2014 | Lanning et al. | |
| 2014/0087821 A1 | 3/2014 | Zoltewicz et al. | |
| 2014/0087860 A1 | 3/2014 | Basallo et al. | |
| 2014/0087861 A1 | 3/2014 | Basallo et al. | |
| 2014/0274294 A1 | 9/2014 | Baerlocher et al. | |
| 2014/0309010 A1 | 10/2014 | Pawloski | |
| 2014/0357342 A1 | 12/2014 | Elias | |
| 2015/0080096 A1 | 3/2015 | Saunders et al. | |
| 2015/0141114 A1 | 5/2015 | Davis et al. | |
| 2015/0248810 A1 | 9/2015 | Wortmann et al. | |
| 2015/0287269 A1 * | 10/2015 | Berman | G07F 17/34 463/20 |
| 2015/0302687 A1 | 10/2015 | Fujita | |
| 2015/0310699 A1 | 10/2015 | Meyer | |
| 2015/0348374 A1 | 12/2015 | Dupuis | |
| 2016/0042597 A1 | 2/2016 | Olive | |
| 2016/0078711 A1 | 3/2016 | Rucker | |
| 2016/0086429 A1 | 3/2016 | Inamura et al. | |
| 2016/0253873 A1 | 9/2016 | Olive | |
| 2016/0335842 A1 * | 11/2016 | Zoble | G07F 17/3213 |
| 2017/0032610 A1 | 2/2017 | Loz et al. | |
| 2017/0092067 A1 * | 3/2017 | Batsiokis | G07F 17/3209 |
| 2017/0124809 A1 * | 5/2017 | Elias | G07F 17/32 |
| 2017/0154498 A1 | 6/2017 | Olive | |
| 2018/0082535 A1 | 3/2018 | Filipour et al. | |
| 2018/0082546 A1 | 3/2018 | Mariscal et al. | |
| 2018/0122183 A1 * | 5/2018 | Wortmann | G07F 17/3209 |
| 2018/0130298 A1 * | 5/2018 | Koshorek | G07F 17/3244 |
| 2018/0218572 A1 | 8/2018 | Caputo | |
| 2018/0225914 A1 | 8/2018 | Heenan et al. | |
| 2018/0261045 A1 | 9/2018 | Takahara et al. | |
| 2018/0268655 A1 | 9/2018 | Olive | |
| 2018/0268657 A1 | 9/2018 | Kroon | |
| 2018/0286183 A1 * | 10/2018 | Davis | G07F 17/34 |
| 2019/0019371 A1 * | 1/2019 | Bolling, Jr. | G07F 17/3244 |

FOREIGN PATENT DOCUMENTS

| | | |
|---|---|---|
| AU | 2016900462 | 2/2016 |
| AU | 2016100230 A4 | 3/2016 |
| AU | 2016202727 A1 | 5/2016 |
| AU | 2016101967 A4 | 12/2016 |
| AU | 2017200840 A1 | 3/2017 |
| AU | 2017204560 A1 | 7/2017 |
| AU | 2017101097 A4 | 9/2017 |
| AU | 2017101098 A4 | 9/2017 |
| AU | 2017101629 A4 | 12/2017 |

(56) References Cited

FOREIGN PATENT DOCUMENTS

| | | | |
|---|---|---|---|
| AU | 2017101730 | A4 | 1/2018 |
| AU | 2017101731 | A4 | 1/2018 |
| AU | 2018278882 | A1 | 1/2019 |
| AU | 201900719 | A1 | 2/2019 |

* cited by examiner

GAMING SYSTEM AND METHOD PROVIDING PERSISTENT INDICATOR AWARDS

FIELD

The present disclosure relates to gaming systems.

BACKGROUND

Gaming systems accept wagers from players in exchange for opportunities to win awards or prizes. Current gaming systems combine various specialized computing technologies to provide systems adapted to gain the attention of players and to keep them engaged with the gaming systems. To retain players' interest, gaming systems that offer new and unconventional functionality are needed.

SUMMARY

The present disclosure is directed to systems and processes for gaming. A gaming system consistent with implementations disclosed herein provides a game that randomly determines symbols and displays such symbols to players using a display device. The gaming system evaluates the displayed symbols to determine whether they correspond to predetermined awards.

In accordance with aspects of the present disclosure, the gaming system provides a game feature (e.g., a bonus game feature) involving multiple rounds (e.g., a quantity of rounds, a quantity of spins, or a quantity of free spins). The gaming system randomly determines different combinations of game symbols (e.g., slot machine symbols) for individual rounds of the game feature, displays such game symbols in symbol display areas of the display device (e.g., symbol display positions of the slot machine), evaluates the displayed combinations of game symbols for predetermined winning combinations, and determines awards corresponding to the winning combinations. Additionally, for the individual rounds of the game feature, the gaming system determines whether to display persistent game indicators at one or more of the symbol display areas. In some implementations, the gaming system randomly determines the persistent game indicators for the symbol display areas separately from the determination of the game symbols. In other implementations, the gaming system determines the persistent game indicators for the symbol display areas along with the determination of the game symbols. For example, certain game symbols may correspond to persistent game indicators such that the persistent game indicators are displayed at symbol display areas of such game symbols. The persistent game indicators may be, for example: a symbol that is adjacent to, underlaying, or overlaying a game symbol, a frame that surrounds a game symbol, a halo displayed around a game symbol, or a background displayed behind a game symbol. The gaming device can hold (e.g., lock) the persistent game indicators in the symbol display areas from round-to-round (e.g., spin-to-spin) such that the quantity of symbol display areas including the persistent game indicators can accumulate during the game. At the end of the game, the gaming system evaluates the displayed persistent game indicators and determines an additional game award (e.g., a bonus award) corresponding to the persistent game indicators accumulated during the game, if any. For example, at the end of the game, the gaming system may determine awards (bonuses) for each displayed persistent game indicator, and a very large award (e.g., a grand bonus) for predetermined combinations of the displayed persistent game indicators (e.g., when a predetermined quantity of the symbol display areas in one or more game reels of a slot machine display the persistent game indicators).

In accordance with aspects of the present disclosure, the multi-round game can be a standalone game or it can be a bonus game triggered by a base game. In some implementations, a bonus controller triggers the gaming system to initiate the bonus game to occur at random times or after predetermined time intervals during the base game. Additionally or alternatively, in some implementations, the gaming system may trigger the bonus game in the event that predetermined symbol combinations are displayed in the base game. For example, a predetermined symbol or combination of symbols displayed along a wagered pay line, displayed in a particular game reel, or displayed in particular symbol display areas may trigger the bonus game (e.g., five horizontally-aligned trigger symbols or three vertically-aligned trigger symbols).

In accordance with aspects of the present disclosure, the multiple rounds of the bonus game can be a quantity of plays or a quantity of spins of game reels, award wheels, or the like (e.g., free spins). In some implementations, the quantity of rounds of the bonus game provided is a fixed quantity (e.g., 10 free spins or other suitable value). In some implementations, the quantity of rounds varies. For example, different trigger symbols (e.g., combinations of symbols) in the base game may provide different quantities of the free spins. Additionally or alternatively, in some implementations the quantity of rounds of the bonus game corresponds to an amount of a wager received from the player. For example, a larger wager in the base game may provide a greater quantity of free spins in the bonus game than a lower wager in the base game.

In an example of an implementation, the gaming system provides a slot machine-type game in which the symbol display areas are arranged so as to represent game reels. For example, the gaming system may be a video slot machine in which the display device displays a game screen including animated representations of five game reels that spin vertically around a common horizontal axis. The individual game reels can comprise columns of three or more symbol display areas. For a play of a game, the gaming system determines game symbols and persistent game indicators for the symbol display areas of the reels using one or more symbol sets. The gaming system displays the symbols, evaluates them for winning symbol combinations, and determines awards for the winning symbol combinations, if any. For example, the gaming system can determine an award corresponding to a predetermined sequence of symbols displayed along active pay lines (e.g., wagered pay lines). Additionally, the gaming system can determine whether the symbols displayed on the game reels of the slot machine trigger the multi-round bonus game. In the rounds of the bonus game, the gaming system generates and displays game symbols (e.g., slot machine symbols) and persistent game indicators. The gaming system may determine awards for combinations of the game symbols displayed in the individual rounds of the bonus game. Additionally, the gaming system may determine an award for the persistent game indicators accumulated in the symbol display areas over all the rounds of the bonus game. In some implementations, the gaming system determines awards for each of the persistent game indicators. Also, the gaming system may determine another persistent indicator award corresponding to a quantity of the game reels having persistent game indicators occupying all of their symbol display areas. For example, the gaming system may provide a persistent indicator award if, after all rounds of the bonus game are completed, three persistent game indicators are displayed in a sequence of symbol display areas of a single game reel. In another example, the gaming may provide a persistent indicator award corresponding to individual game reels including a combination of two or more persistent game indicators (e.g., a sequence of two adjacent persistent game indicators on an individual reel). It should be appreciated that the gaming system may provide an award before all free spins of the bonus game are complete in some implementations.

In accordance with aspects of the present disclosure, the gaming system can be one of a number of gaming systems in communication with a bonus award server (e.g., a progressive bonus controller). For example, the gaming system may be one of several gaming systems in a bank of gaming systems that provide different base games and bonus games (e.g., games having game symbols corresponding to different themes, symbology, rules, odds of winning, pay tables, or return to player percentages) but substantially similar persistent indicators (e.g., persistent indicators corresponding to the same rules, odds, and return to player percentages, but some different themes and symbology). In implementations, the bonus game can provide one or more progressive bonus awards accumulated from wagers placed at the number of linked gaming systems, and any one of such gaming systems can win some or all of the progressive bonus awards. In some implementations, the bonus award server provides a single progressive bonus award that is only paid out if all symbol display areas (e.g., slot machine reel display positions) in a bonus game screen (e.g., video display of slot machine reels) include the persistent game symbology. In some implementations having more than one progressive bonus award, such awards can be paid out if less than all symbol display locations include the persistent game symbology. For example, persistent game symbology displayed in all symbol display areas of one out of five game reels could pay out a first progressive bonus award; persistent game symbology displayed in all symbol display areas of two out of five game reels could pay out a larger progressive bonus award; and persistent game symbology displayed in all symbol display areas of five out of five game reels could pay out a grand progressive bonus award.

As described above and set forth in greater detail below, gaming systems in accordance with aspects of the present disclosure provide a specialized computing device integrating non-generic hardware and software that improve upon the existing technology of human-computer interfaces by providing unconventional functions, operations, and symbol sets for generating interactive displays and outputs. Such combination of features provides a practical implementation of hardware and software that improves the operation of the gaming systems for their specialized purpose of providing entertainment by reducing player disappointment with game outcomes, by enhancing player enjoyment, and by increasing player engagement.

In some implementations, the features described herein technically improve the operation of gaming systems for their specialized purpose by merging multiple game features (e.g., game rounds, game stages, or sub-games) into a single game presented on a common game screen so that the overlapping game features operate in cooperation, rather than operating in isolation. Merging the multiple game features so they overlap and cooperate in a common game screen technically improves some implementations of the gaming system by reducing the display area used by the gaming system. Thereby, such implementations of the gaming system can reduce power consumption in comparison to gaming systems that use, for example, a display area to, display a base game feature, and a different display area to display a substantially separate bonus game feature. Further, doing so can reduce the physical complexity and manufacturing cost of the gaming systems in some implementations by reducing the number or size of display devices used by the gaming systems.

Additionally, the features of the gaming system technically improve the operation of the gaming systems for their specialized purpose by providing unique combinations of functions that provide a persistent symbol game substantially concurrently (e.g., at overlapping, simultaneously, or at substantially simultaneously) with another type of game (e.g., a slot machine game). Further, by operating the two types of games concurrently, games initiated by gaming systems in accordance with the present disclosure can be completed more quickly than systems that provide such games serially. By doing so, the disclosed gaming systems can increase the usage rate (e.g., duty cycle) of the gaming system by allowing more games to be completed in a shorter time period (e.g., games per hour) and by reducing power consumed during a single game (e.g., one play of the game). When such speed and efficiency improvements are applied in the hundreds or thousands of game evaluations performed over time by multiple installations of the gaming system (e.g., multiple devices installed at a casino), implementations of the disclosed gaming system provide game operators substantial gains in gaming system efficiency, which is another technical improvement.

DETAILED DESCRIPTION

The present disclosure provides systems and processes for gaming and amusement devices. As detailed previously herein, a gaming system consistent with the present disclosure provides a game involving multiple rounds of a game feature. In implementations, a round may be an iteration, a play, a trial, or an attempt of a game feature. For example, a round may comprise one spin of a slot machine game feature or of award wheel game feature. For the individual rounds of the game feature, the gaming system can display randomly determined combinations of game symbols at symbol display areas of a game screen and determine awards corresponding to the winning combinations. Additionally, for the individual rounds of the game feature, the gaming system can determine persistent game indicators and display them at one or more of the symbol display areas. Whereas the game symbols may be replaced from round-to-round of the game feature, the persistent game indicators can be held in the symbol display areas from round-to-round of the game feature such that the quantity of symbol display areas including the persistent game indicators accumulate during the game feature. At the end of the game feature, the gaming system can evaluate the displayed persistent game indicators and determine whether the persistent game indicators accumulated correspond to a persistent indicator awards.

Gaming Device Platform

The features and advantages of the systems and methods described herein may be provided to a player via a gaming system that includes various structures and components for allowing player interaction with the gaming system. While one example of a gaming system is primarily described in detail herein, it is understood that the features, objects, and advantages of the gaming system described herein may be implemented in one or more alternative gaming systems.

Figure 1:
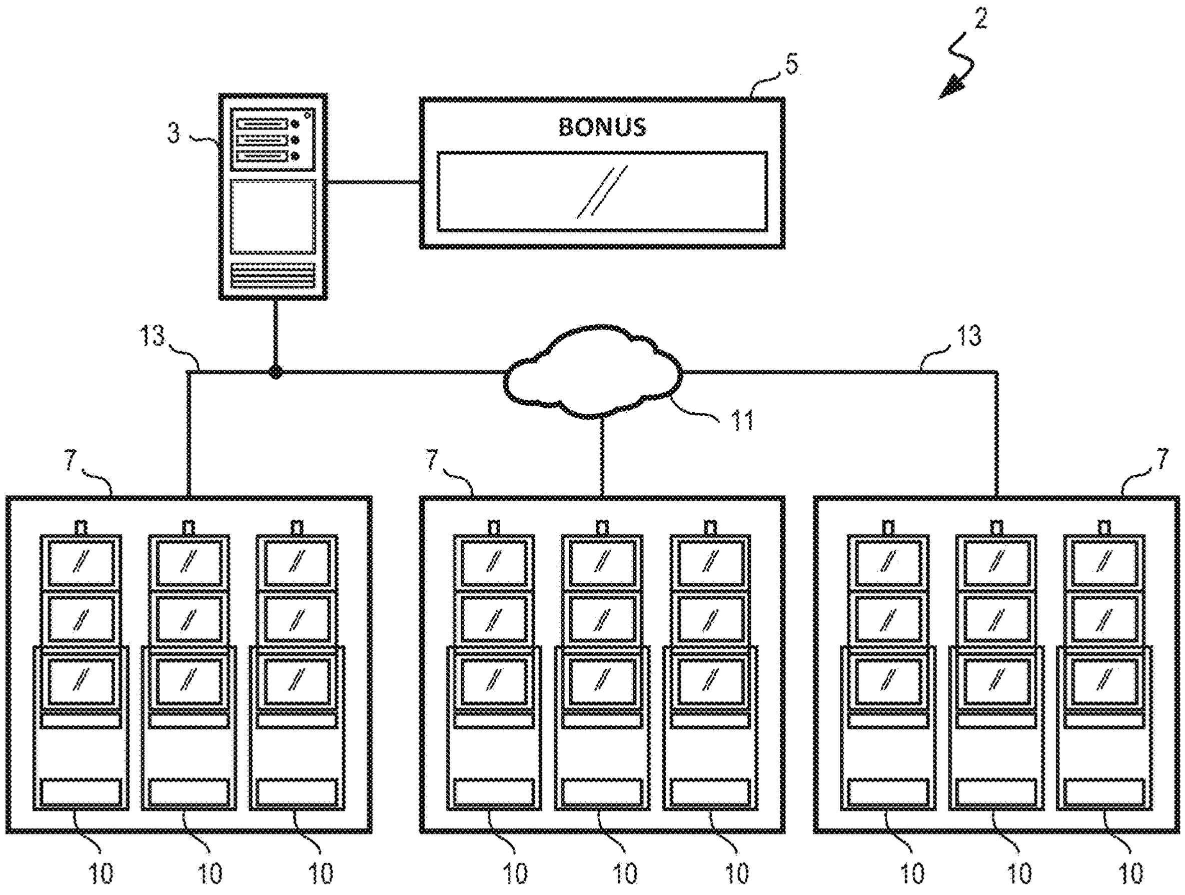
FIG. 1 illustrates an example of an environment for implementing systems and processes in accordance with aspects of the present disclosure.

FIG. 1 illustrates an example of an environment 2 for implementing systems and method in accordance with an implementation of the present disclosure. The environment 2 includes a bonus server 3 and a bonus display 5 that are functionally connected with one or more banks 7 of one or more gaming systems 10 via an information network 11 and one or more wired or wireless communication links 13. The bonus server 3 can be one or more computing devices comprising hardware, software, or a combination thereof that manages bonus games provided by the gaming systems 10 of one or more of the banks 7. In implementations, the bonus server 3 functions to collect and maintain funds for one or more bonuses, display the values of the bonuses using the bonus display 5, and provide the bonuses to the gaming systems 10. For example, the bonus server 3 can maintain different pools of funds corresponding to different bonus levels (e.g., small, large, and grand/jackpot bonuses). In some implementations, the bonuses can be progressive bonuses in which the bonus server 3 incrementally accumulates the pools from wagers made at the gaming systems 10.

The bonus display 5 can include one or more display devices that display values of the bonuses managed by the bonus server 3. The bonus display 5 can be a video display or a mechanical display device. For example, the bonus display 5 can be a cathode ray tube (CRT) display, a liquid crystal display (LCD), a light-emitting diode (LED) display, a flip card display, a reel display, etc. The bonus display 5 may be located so as to be viewable by players of the gaming systems 10 in a same location or a same bank 7. In some implementations, the banks 7 of gaming systems 10 can be collocated within view of the bonus display 5. While FIG. 1 shows a single bonus display 5, it is understood that the environment 2 can include more than one bonus display 5. In some implementations, multiple bonus displays 5 may be used, such as when some of the banks 7 are at different physical locations. In some implementations, the individual gaming systems 10 can include respective bonus displays 5. For example, the gaming systems 10 can include respective top displays (e.g., display 134 in FIG. 2) repeating the function and information provided by the bonus displays 5. All bonus displays connected to the network 11 may have substantially the same information displayed. For example, while individual banks 7 or gaming systems 10 may have different games or themes, such banks 7 and gaming systems 10 may participate in bonus games having a common bonus pool that is managed and paid out by the bonus server 3 based on the accumulation or combinations of persistent game indicators.

The banks 7 can include two or more gaming systems 10 that may be at the same or different locations as the bonus server 3 or one another. The locations can be different spaces within a single facility (e.g., casino, airport, or mall) or in spaces at separate locations.

The network 11 can be a wired or wireless computer network that functions to exchange information between the bonus server 3 and the gaming systems 10. The network 11 can be, for example, a peer-to-peer network, a local area network, a wide area network, or the Internet. The network 11 may be located in a single location or spread over multiple locations and may be connected to other networks.

The gaming systems 10 in the network 11 may include displays for a main game and a bonus game. The bonus game may be common to the gaming systems 10, while one or more of the gaming systems 10 may provide different base games. The bonus may be provided when certain criteria at one of the gaming systems 10 are achieved in the bonus game. The criteria may be, for example, the display of a particular symbol or symbol combination, or a particular outcome of the bonus game.

In some implementations, the gaming systems 10 may participate in multiple bonus games having respective bonus awards. For example, a first bonus may be available when the player makes a small wager, a second, larger bonus may be available when the player makes a larger wager, and a third, still larger bonus may be available when the player makes an even larger wager. It understood, however, that the different bonus levels available may not be associated with wagers of a player. Instead, for example, all of the different bonus levels may be available to the player and the award of a particular level may correspond to the outcome of the bonus game.

Figure 2:
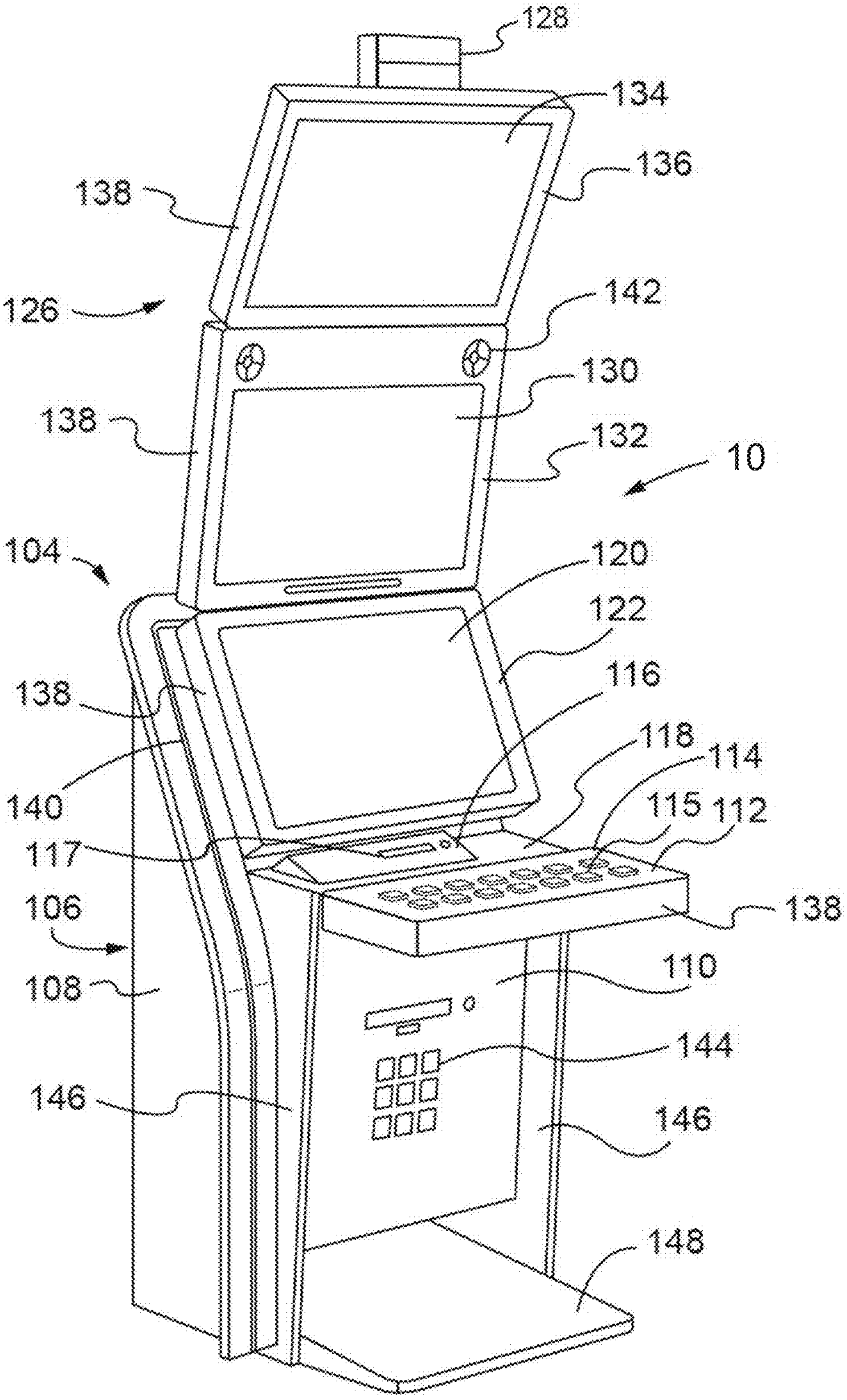
FIG. 2 shows a perspective view illustrating an example gaming system in accordance with aspects of the present disclosure.

FIG. 2 shows a perspective view illustrating an example of a gaming system 10 in accordance with aspects of the present disclosure. Such gaming system 10 may be referred to as a slot machine and, as illustrated, is housed in a cabinet 105 (e.g., a housing) constructed so that a player can operate and play the gaming system 10 while standing or sitting. The cabinet 105 can include a lower cabinet body portion 106, which includes a pair of cabinet side panels 108 (only one of which is viewable in the perspective view of FIG. 1), a front panel 110, and a rear panel (not shown). Additionally, a base panel (not shown) and a top panel surface (not shown) may support a first game display device 120 and the player interaction area 112. The cabinet panels 108 and 110 (as well as the base panel and the top panel surface) may be interconnected along their edges and cooperate to form the cabinet 105, which encloses and houses components of the gaming system 10. The cabinet 105 may function to securely protect local control system, technology components, and provide support for game display(s) and player input and output interactions with the gaming system 10, such as describe herein below.

While the example cabinet 105 is depicted as having a particular shape, structure, and organization, it should be appreciated that a wide variety of cabinet enclosure sizes, shapes, and designs are possible for the gaming system 10. For example, the cabinet panels 105, 106, 108, 110 (as well as the base panel and the top panel surface) may be combined into fewer elements or divided into additional elements. Additionally, the positions of the displays (e.g., first display device 120) and input/output devices can be reorganized and/or relocated with respect to one another.

In accordance with aspects of the present disclosure, a player can interact with the gaming system 10 in various ways to direct the wagering and game play activities and preferences. More specifically, the cabinet 105 includes input and output areas generally designated as the player interaction area 112. The player interaction area 112 may be located on the front top side of cabinet 105 and, as shown, on a panel structure that extends outwardly from the gaming system 10 in a player's direction. The player interaction area 112 may contain player input and output structures, including a player control area 114, a player value acceptor and dispenser area 116, and player convenience input area 118.

The player control area 114 includes one or more input devices 115, such as buttons and touch sensitive areas, through with which players may interact with the gaming system 10 so as to direct game play. It is expected that the cabinet 105 provides an easily accessible location and support for player input/output (I/O) interactions with the gaming system 10, including gaming control interactions and value wagering interactions. Although the gaming system 10 illustrated in FIG. 2 shows the input devices 115 of the player control area 114 as physical controls (e.g., buttons), it is understood that in some implementations, a player's gaming control interactions could be made by either the physical controls or functionally equivalent "soft" controls (e.g., soft buttons) located on the gaming display and activated by player touch (e.g., touch screen interfaces), or a combination of both arrangements.

The input devices 115 may include the following: game selection button(s) in any implementation where more than one game is provided in a single gaming system 10; gaming denomination value selection button(s) in any implementations where one or more wagering denomination value is accommodated; wager selection button(s) for the player to indicate or select the desired wager value for a game in any implementations where a selection of wager values are offered; pay line selection button(s) for selecting the quantity of active pay lines in game implementations that provide multiple pay line wagering; a reel spin button for players to initiate one or more reels to spin in a game; a repeat last bet button for players to conveniently repeat the last game's preference and wager selections in a new game; a cash-out button for player extraction of gaming system credits; an attendant call button; and gaming system information buttons such as show pay tables, show game rules, or show other game-related information. While input devices 115 are described as buttons, it is understood that the input devices 115 can by other types of selection devices, such as gesture input devices (e.g., touch screens), audio input devices (e.g., speech recognition), and eye-tracking input devices (e.g., an eye mouse).

The player value acceptor and dispenser area 116 may include one or more value acceptance and value distribution devices 117 that allow the player to interact with the gaming system 10 and to risk or otherwise place a wager (a monetary value) on one or more outcomes of a game. The value acceptance and value distribution devices 117 may return winnings to the player via some form of value distribution. In the player value acceptor and dispenser area 116, a player can supply monetary value to the gaming system 10 via the value acceptance and value distribution devices 117. In some implementations, the value acceptance and value distribution devices 117 may accept any one or more of the following from a player to establish a gaming credit balance: coins, bills, tokens, tickets/vouchers, player ID cards, credit cards, or other suitable forms of value. Thus, if the gaming system 10 accepts coins and bill, the value acceptance and value distribution devices 117 may comprise a currency bill validator and a coin validator. Likewise, if the gaming system 10 accepts tickets, the value acceptance and value distribution devices 117 may comprise a ticket acceptor that receives tickets or vouchers representing some monetary value. The ticket acceptor may include a bar code reader, or other appropriate code reader, for reading the encoded value contained by the player's ticket or voucher. In some implementations, value acceptance and value distribution devices 117 can accept more than one type of value. In some implementations, the player value acceptor and dispenser area 116 may include multiple different value acceptance and value distribution devices 117 that accept different types of value from players.

Upon receipt of some type of value from the player, the value acceptance and value distribution devices 117 of the player value acceptor and dispenser area 116 can perform validation on the player supplied value using appropriate hardware readers (e.g., determining that the currency bills/coins/tokens are genuine or the ticket/voucher is genuine). If the validation result is positive on player supplied value, the value acceptance and value distribution devices 117 can generate a signal to a processor of the gaming system 10 that establishes a gaming credit balance for playing one or more games on gaming system 10.

In some implementations, the value acceptance and value distribution devices 117 dispenses a monetary value, or a representation thereof, from the gaming system 10 when a player chooses to "cash out" the gaming credit balance (e.g., remove value from the gaming system 10). The player can cash out at any suitable time. When a player cashes out the value contained on a credit meter (not shown) of gaming system 10, a processor of gaming system 10 may cause a printer included in the value acceptance and value distribution devices 117 to print and dispense a coded ticket or voucher through a dispensing slot to the player. The coded ticket or voucher may be a bar-coded ticket or any other suitable code (PDF517 coding or quick response (QR) coding). This ticket can then be used as value input at another gaming system, or converted to currency at a conveniently located kiosk or cashier counter located near the gaming system. Alternatively, the processor of gaming system 10 may cause a currency bill dispenser or a coin dispenser included in the value acceptance and value distribution devices 117 to dispense the value contained on the credit meter of gaming system 10.

Various combinations of the above value acceptance and value distribution arrangements are possible. The gaming system 10 may include other value acceptance and value distribution mechanisms in the player value acceptor and dispenser area 116. For example, the value acceptance and value distribution devices 117 may include a magnetic strip or chip card reader/writer in order to accept value from and transfer value to a magnetic strip or an embedded chip card. In other implementations, the value acceptance and value distribution devices 117 may include hardware for transferring (and receiving) non-traditional currencies to players such as digital currencies (e.g., bitcoin).

In some implementations, the value acceptance and value distribution devices 117 may include a card reader that accepts and reads any of a variety of magnetic strip or imbedded chip smart cards that convey machine readable information. The card reader reads inserted cards, in the case of wagering, for the credit information of the player for cashless gaming. The card reader may, for player loyalty programs, utilize the information on the card to identify the player account associated with the card so the gaming activity on the gaming system 10 may be associated with the player account. Additionally, a numeric or alphanumeric keypad (not shown) may be provided adjacent to the card reader slot that enables player entry of a personal identification number or the like for secure access to card information.

In some implementations, a player convenience input area 118 may be included in the gaming system 10, as is shown in FIG. 2. In various implementations, player convenience input area 118 may have a variety of features and functions depending on the jurisdictional deployment of the gaming system 10. In some implementations, the player convenience input area 118 may house a magnetic strip card reader (not illustrated), integrated circuit chip card reader (not illustrated), or both, for reading cards associated with a player loyalty program. Player loyalty programs, also referred to as player tracking systems, provide magnetic strip or chip cards to players for insertion into the gaming system 10 during play. These player loyalty/players tracking cards may be associated with a player account and are utilized by the card-issuing entity to monitor, or track a player's gaming activity and build loyalty through player rewards of a variety of types. The player convenience input area 118 may include an input mechanism such as input buttons so that a player may input a personal identification number or other require player information associated with the player tracking card. Further, the input mechanism may also include a small display utilized to communicate player information to the player such as the player's current loyalty rewards.

In certain implementations, the player convenience input area 118 may include player convenience features such as a pocket for storage that allows players to store their personal items such as a mobile phone. The gaming system 10 may include one or more universal serial bus (USB) ports that enables a player to charge their electronics or connect to services such as the Internet or food service. Further, player convenience input area 118 of the gaming system 10 may include buttons to request food or drink service if the gaming system 10 is located in an establishment that has food and drink service. The gaming system 10 may be connected to a local or wide area network such that selection of the requested food or drink service may alert the establishment's hospitality staff to deliver the requested service directly to the gaming system 10.

The layout of the player control area 114, player value acceptor and dispenser area 116, and the player convenience input area 118 in gaming system 10 may be arranged differently than those disclosed and illustrated herein. The selections and arrangement of input locations on the cabinet 105 may be dependent upon the game buttons, the type of value wagered, and the player conveniences utilized in the deployment configuration of gaming system 10.

In some implementations, the lower cabinet body portion 106 includes the first game display device 120, which can be mounted atop or flush with a top panel surface of the lower cabinet body portion 106. The first game display device 120 can be, for example, a 27-inch liquid crystal display (LCD) display mounted in a widescreen orientation. However, any suitable display may be used in any suitable orientation. In the illustrated implementation, the first game display device 120 can mounted within and framed by first display frame 122 which is, in turn, mounted upon lower cabinet body portion's top panel surface. In this manner, the first game display device 120 is both surrounded and secured within the first display frame 122 and raised above the cabinet's top panel surface. Additional features of the first display frame 122 are described below. In some implementations, the gaming system 10 may use a single first game display device 120 and not include additional game displays (not illustrated). For example, a single first game display device 120 may span the one or more portions of the cabinet 105 (e.g., lower body cabinet portion 106 and upper body cabinet body portion 126, described below) in place of other display devices (e.g., display devices 130 and 134, described below).

The lower cabinet body portion 106 can be further constructed to support an upper cabinet portion 126. The upper cabinet portion 126 may be comprised of an upwardly extending support structure (not illustrated) that extends upwardly from the rear side of lower cabinet body portion 106 configured to mechanically support one or more additional game display devices.

At the topmost end of the support structure, a cabinet top light 128 may be provided. The cabinet top light 128 is capable of illumination in a variety of colors and is utilized to indicate and communicate conditions of the gaming system 10 to gaming players and service personnel.

Further, the upper cabinet portion support structure may conceal power and communication lines between (1) the control systems and components located within the lower cabinet body portion 106 and (2) the displays mounted on the upper cabinet portion 126 support structure.

In some implementations, as illustrated in FIG. 2, gaming system 10 includes additional displays, including a second game display device 130 and a third game display device 134. The second game display device 130 and the third game display device 134 can be disposed generally in a vertical relationship and generally in alignment with the first game display device 120. Like the first game display device 120, the second game display device 130 and the third game display device 134 can be 27-inch LCD displays and can be mounted in a widescreen orientation in some implementations. However, any suitable display in any suitable orientation may be used for the second game display device 130 and the third game display device 134. Further, like the first game display device 120, the second game display device 130 and the third game display device 134 can be mounted within and framed by second display frame 132 and third display frame 136, respectively. The second display frame 132 and the third display frame 136 can be attached to the upper cabinet support structure and can protect the second game display device 130 and the third game display device 134.

The first game display device 120, the second game display device 130, and the third game display device 134 can be disposed at an angle from each other to form a player-facing concave arc. However, in some implementations, the angles between the displays 120, 130, and 134 may be adjustable and may be smaller or greater than the angles illustrated in FIG. 2. Further, it is understood that in some implementations the displays may be disposed in a common plane relative to each other.

It also should be appreciated that in various implementations a variety of display technologies may be utilized equivalently and interchangeably with a variety of implementations of the gaming system 10. Equivalent display devices include all variations of liquid crystal displays, light emitting diode displays, and plasma displays.

In some implementations, different sized displays may be combined to display gaming data on gaming system 10. As a non-limiting example, a 27-inch widescreen LCD display may be combined with a 20-inch portrait-oriented LCD or a light emitting diode (LED) display. This combination may be used, for example, with a third scrolling banner LED display. In alternative implementations, one, two, three, or more displays could be used in a variety of positions and orientations. Any suitable combination may be used. It should also be appreciated that a processor of gaming system 10 may communicate with the disclosed first game display device 120, second game display device 130, and third game display device 134 through a video card of gaming system 10 to produce the visible aspects of a game.

In some implementations, one or more of the first game display device 120, the second game display device 130, and the third game display device 134 may be fitted with a transparent touch sensitive overlay for sensing player touch inputs into the gaming system 10. The touch sensitive overlays can communicate with a processor of gaming system 10 to enable the player to interact with the game.

In some implementations, the curved displays may be used for any or all of the first game display device 120, the second game display device 130, or the third game display device 134. Similarly, any of the displays used for gaming system 10 can be based on flexible display technologies. For example, it is possible to utilize flexible display technologies to create uniquely shaped curving, wavy, or tubular display structures to provide one or more of the first game display device 120, the second game display device 130, and the third game display device 134. Additionally, in some implementations flexible display technologies can be used in combination with fixed flat screen technologies.

While the gaming system 10 has been described as implemented with video technologies, in some implementations, mechanical reels with reel strips containing game indicia and step motor controllers may be employed to provide game information to a player. In some implementations, the reel strips may include printed symbols. In another implementation, the mechanical reels may include flexible video display technology as the reel strips on mechanical reels. Thus, games implemented in video form can readily be implemented with mechanical reels utilizing such display technology. Alternatively, in other implementations mechanical reels with reels strips having fixed symbols displayed along the reel strip could be used to implement the game.

Dependent upon the particular housing style of the gaming system, a variety of other display technologies may be utilized in combination with the gaming system 10 disclosed herein. For example, the gaming system 10 may have one or more display devices in addition to the main game display devices(s) in some implementations. For example, the gaming system 10 may include a player tracking device having a player tracking display which displays various information to the player regarding the player's status. The gaming system 10 may also include other game-related displays such as the wager display and the gaming credit balance display. These additional game-related displays may be separate display devices or may be displayed on any one or more of the first game display device 120, the second game display device 130, or the third game display device 134.

The gaming system 10 may also include cabinet lighting design functions to attract players. In the example gaming system 10 illustrated in FIG. 2, attractive cabinet lighting is provided by frame accent lighting 138. It is noted that frame accent lighting 138 is a common structure found on the first display frame 122, the second display frame 132, and the third display frame 136 and player interaction area 112. Example areas where frame accent lighting is applied to the gaming system 10 are commonly designated as frame accent lighting 138.

Frame accent lighting 138 may have multiple components. The side edge pieces of first display frame 122, second display frame 132, third display frame 136, and the edge structure of player interaction area 112 can be made of a translucent or transparent plastic or other suitable materials. Linear arrays, or strips, of light emitting diodes (LEDs) (not shown) on circuit boards may be mounted below the translucent or transparent plastic side edge pieces 138. In some implementations, the circuit boards are flexible circuit boards. These LED strips and transparent or translucent coverings may surround one or more displays frames, as well as the player interaction area, to highlight these areas.

In some implementations, the individual LEDs mounted on the LED strips are of a type that can emit red, green, and blue light. In an alternative implementation, separate LEDs are used for the light colors. All LED strips can be electrically connected and can be controlled by a lighting controller (e.g., lighting controller 318 in FIG. 3) in conjunction with a processor of the gaming system 10 to selectively mix the emitted light colors in a manner to create any color. The lighting controller can flash and vary lighting as desired. For example, cabinet edge lighting can change and flash in combination with music rhythms or in combination with game events. Other variations are possible.

In some implementations, cabinet 105 may include LED strip lighting or LED rope lighting to accentuate the cabinet and enhance the attractiveness of the gaming system 10 to players. LED rope lighting is a number of small light-emitting diode bulbs linked together and encased in a plastic, polyvinylchloride, or other suitable material to create a string of lights. For example, in one implementation illustrated in FIG. 2, cabinet 105 includes cabinet accent lighting 150. In some implementations, cabinet accent lighting 150 is LED rope lighting mounted flush with the front side edge of the cabinet side panels 108. The LED rope lighting can generate any of suitable colors, and are controlled by a lighting controller and a processor of gaming system 10 to selectively mix the emitted light colors in a manner to create any color in the same manner as the frame edge lighting.

In various implementations, gaming system 10 includes one or more audio speakers 142 and appropriate driving electronics and sound cards so that game players may experience pleasing audio aspects of the gaming system 10. Audio is desirable to attract and maintain player interest in gaming system 10. The gaming system 10 may also emit attraction sounds during any idle period of gaming system 10. Game audio may add to the player's enjoyment of gaming system 10 by providing music and sound effects designed to enhance and compliment the gaming experience. In FIG. 2, the audio speakers 142 are shown mounted on the upper corners of second display frame 132. Any suitable quantity of additional audio speakers 142 may be provided on additional display frames or on the lower cabinet body portion 106 as desired.

The audio speakers 142 designed for emitting bass vibrations may be included in some implementations. Placement of the audio speakers 142 may be selected to enhance the sound emitting characteristics of the gaming system 10. For example, bass speakers or additional speakers 155 may be mounted inside lower cabinet body portion 106. Further, it is envisioned that in some implementations sound processing such as multichannel processing and surround sound processing are included in gaming system 10. Audio jacks for attachment of player headphones may also be provided in some implementations of gaming system 10 for the player to further enhance the audio experience of the game and also to block out noise from other gaming systems.

In some implementations, the front panel 110 of lower cabinet body portion 106 includes a locked removable panel or locked door (not shown), which can be opened for access to internal control system and technology components that are housed within lower cabinet body portion 106 (discussed hereinbelow with respect to FIG. 2). Front panel 110 may be flanked on vertical sides by cabinet side panel extensions 156 which serve to define a space below player interaction area 112 for players to place their feet and legs while they are playing the gaming system 10 in a seated position. Foot rest 158, which may be cushioned, is provided below player interaction area 112 to enhance a player's ergonomic comfort while playing the gaming system 10. In some implementations, the edges of player interaction area 112 may be ergonomically cushioned as well.

The gaming system 10 may be embodied in alternative housing forms and styles. For example, the housing may have fewer or greater number of display areas for displaying the game and game-related information to the player. If multiple displays are used, the displays may be of similar size, shape, and orientation or the displays may be divergent from each other in one or more of their respective descriptive characteristics. The one or more displays can be supported by, mounted upon, or housed within a cabinet 105 which can comprise a variety of shapes, sizes, and forms. The cabinet 105 can protect and house the operational electronics, 2) adequately support the display(s) in a position easily viewable for a seated or standing player, as necessary, and/or 3) provide an easy location and support for all necessary player input/output (I/O) interactions, including gaming control interactions and value wagering interactions. For example, in some implementations the gaming system 10 may be disposed in a housing style referred to as a "slant top" gaming system that is designed to be operated with the player comfortably seated. In this arrangement, generally, the gaming display(s) and all player I/O controls are located on a low, wide, surface that extends forwardly from the player on a horizontal plane and then slopes upwardly and away from the player's seated location.

In some implementations, housing styles of cabinet 105 of gaming system 10 may include bar top or table top housing arrangements. These housings are generally small enough to be placed on top of an existing bar or table while providing the requisite gaming system housing functions of protection of/access to gaming electronics, displays, and player I/O functions described above.

In some implementations, cabinet 105 may be an embedded housing. Embedded housings are built into structures designed to otherwise function as bars or tables in a gaming environment. Displays may be integral with the bar top or table top surface or the entire unit may be contained below a transparent bar or table top surface while controls are disposed on the lower front or side of the bar or table.

Figure 3:
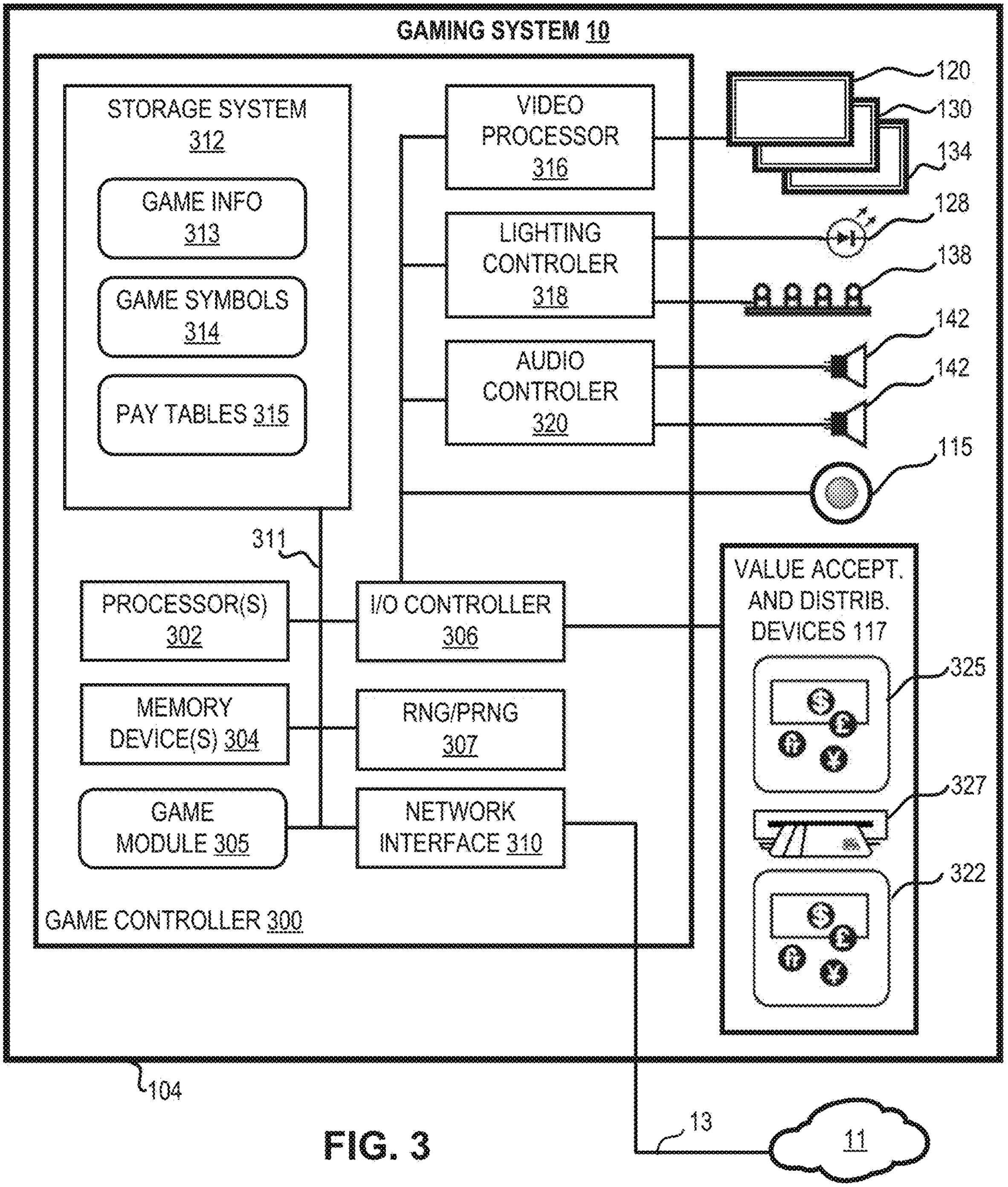
FIG. 3 shows a functional block diagram illustrating a game controller and gaming system in accordance with aspects of the present disclosure.

FIG. 3 shows a functional block diagram illustrating an example of a game controller 300 of a gaming system 10 in accordance with aspects of the present disclosure. The gaming system 10 can include a cabinet 104, one or more player input devices 115, one or more value acceptance and value distribution devices 117, one or more display devices 120, 130, and 134, a cabinet top light 128, accent lighting 138, and one or more audio speakers 142, which can be the same or similar to that previously described herein. Additionally, implementations of the game controller 300 include one or more processors 302, one or more memory devices 304 (e.g., random access memory and read only memory), a game module 305, an input/output (I/O) controller 306, a random number generator 307, a network interface 310, a communication channel 311 (e.g., a data bus), a video processor 316, a lighting controller 318, and an audio controller 320. In accordance with aspects of the present disclosure, the game controller 300 is configured to perform specialized game functions and operations, consistent with the implementations described herein. The functional elements shown in FIG. 3 cooperate, on a broad and general level, to function as a gaming system providing the functionality and operations detailed below. Such functionality and operations can be embodied in hardware, software, or a combination thereof. It is understood that the below described hardware includes the structures described, as well as the functional or operational equivalents of such structures. Further, it is understood that the below-described functions can be performed by hardware, digital circuitry, computer software, computer firmware, or functionally equivalent combinations thereof.

The processor 302 can be one or more general-purpose processors, special-purpose processors, or other programmable data processing apparatuses providing the functionality and operations detailed herein. In some implementations, the processor 302 is specially configured with arithmetic logic units and math co-processors, also known as floating point units, for performing the gaming consistent with the various implementations disclosed herein. In some implementations, the processor 302 includes registers for holding instructions or other data, and cache memory for storing data for faster operation thereupon.

A controller, in some implementations, is a device or a software program that manages or directs the flow of data between two entities. Often, controllers are special purpose circuitry or software that solve a technical communications problem between different technology systems. In some implementations, a controller functions as an interface between two systems while managing the communications between the systems. In another implementation, a controller functions as an interface between a processor and a peripheral device and functions to control the peripheral device.

The memory device 304 can be operatively and communicatively connected to the processor 302. In some implementations, the memory device 304 includes one or more types of memory structures. For example, the memory structures can include random access memory (RAMs) units, read only memory (ROMs), flash memory (e.g., solid state drives (SSDs)), and electrically erasable/programmable read only memory (EEPROMs). It should be appreciated that in some implementations, communication with the memory device 304 by the processor 302 or a controller, encompasses the processor or controller accessing the memory device 304, exchanging data with the memory device 304, or storing data to the memory device 304.

The memory device 304 may store program code, game code (collectively the "code" or "program instructions," such as game module 305), and operational data (e.g., game information 313, game symbols 314, and pay tables 315) used in the operations of the game controller 300 to provide a gaming system that executes the gaming functions described hereinbelow. In an alternative implementation, the code and operational data for the operation of the game controller 300 may be stored in a distributed manner such that some code is stored in memory device 304 (or storage system 312) and other code is stored remotely from the game controller 300. In some implementations, the code and operational data used the operation of the game controller 300 includes, for example, basic input and output function data, instruction fetching data, bus and network communication protocol data, and like data for an operational gaming system. In some implementations, the code (e.g., game module 305) and operational data (e.g., game information 313, game symbols 314, and pay tables 315) used for the execution of the gaming features includes, for example, game image data, game rule data, pay table data, game mode and timing data, gaming value and wager parameter data, and random or pseudo-random number generation data.

In addition to the memory device 304 described above, in some implementations, the code and operation data for the operation of the gaming system described above may be stored in storage system 312. The storage system 312 can be removable game cartridges or flash drives, a compact disk ROM, a digital versatile disk (DVD) optical storage technology, or suitable other fixed non-transitory, computer-readable storage devices. In another implementation, part or all of the code and operational data for operation of the gaming system or for execution of the game features may be stored in a remote memory structure and be downloaded to the memory device 304 via a network connection.

In some implementations, the game controller 300 may utilize any combination of memory devices such as random-access memory devices (RAMs), unalterable memory devices (ROMs), and mass storage devices for securely storing and securely communicating the software components or code that facilitate game play and other functions of the game controller 300. The memory devices may store software components or code that include various game data and game related control and execution software. In some implementations, the software components stored in the memory devices 304 may include gaming system initialization software, system basic input and output software, operating system software, value acceptor software, value dispenser software, display image generation software, game symbol set image generation software, game rule execution software, game data set(s), random number generation software, system driver software, system data bus management software, audio generation and speaker driver software, and video generation and display driver software, and any other suitable software routines for operation of the game controller 300.

In some implementations, memory devices, such as memory device 304 and storage system 312, with the software components and other data may be secured and authenticated by authentication software stored in an unalterable memory device within the housing of the game controller 300. The game controller 200 may also include application specific integrated circuits (ASICs) to perform the security and authentication functions. At various time or events, such as before each play of a game, at a predetermined interval, upon transfer of any game data or any software components from a mass storage to the memory device 304, or upon demand, the game controller 300 (using a processor such as processor 302 or a separate ASIC) may execute an authentication routine and perform an authentication of any software component or other data of the game controller 300. In some implementations, the gaming system software components may be prepared for authentication via creation and storage of an encrypted signature unique to one or more of the software components.

In some implementations, an encrypted signature may be created by utilizing a hash function on a software component or code to form a message digest (i.e., a hash of the software component) followed by a key encryption of the message digest to form an encrypted signature unique to the software component. In some implementations, the key encryption may be public key encryption, private key encryption, or any suitable key encryption schema. The encrypted signature may be stored with the gaming system software component, for example, in a mass storage device or an unalterable memory. During a software component authentication, the gaming system 10 executes one or more authentication routines utilizing the same hash function to operate on the software component to compute, or re-create, a new message digest for the software component. The new or re-created message digest may then be compared with a previously created message digest obtained by decrypting the stored encrypted signature. Matching message digests between the new and previously created message digests indicate that the software component is authentic and the game controller 300 may allow game play to proceed. However, when the message digests do not match, the game controller 300 may determine that the software component under authentication may be corrupted or fraudulent and game play may be halted. It should be appreciated that the game controller 300 may perform other suitable security and authentication checks on the game data or software components. Such authentication and security devices and functions are unique to gaming and casino industry to minimize or prevent fraud in gaming devices and gaming systems.

For a player to interact with a gaming system, the game controller 300 receives and processes player inputs from, e.g., input device 115, and the game controller 300 causes processed results to be output or communicated to the player. In some implementations, player inputs are recognized and processed or directed for processing by input/output (I/O) controller 306. Further, I/O controller 306 may process and direct player outputs for communication to the player. The I/O controller 306 can function as the intermediary between the processor 302 and one or more input devices to control information and data flow therebetween. I/O controller 306 may also function as the intermediary between the processor 302 and one or more output devices to control information and data flow therebetween. I/O controller 306 is configured to understand the communication and operational details (such as hardware addresses) for the attached input devices and output devices. In this manner, processor 302 is freed from the operational details of the peripheral I/O devices. For example, in some implementations where an input or output device is changed or upgraded, the I/O controller 306 can be changed without changing other gaming system components.

In some implementations, a player deposits value into a gaming system by inserting some form of currency into a value acceptor 325 for game play. Alternatively, a player deposits value into a gaming system by inserting an encoded paper ticket into a value acceptor 325 for game play in some implementations. The value acceptor 325 can be combined with a currency reader and validator, and a code reader for reading value encoded on paper tickets. The value acceptor 325 may read, validate and communicate the amount of the inserted value to the processor 302. The processor 302 can establish a gaming credit balance for the player based on the communication from the value acceptor 325. Processor 302 can also communicate the player's credit balance on a credit balance display of gaming system 10. During game play, the processor 302 processes a player's wagers and determines the amount of credits to debit from the player's credit balance. When a winning outcome is obtained, the processor 302 is configured to determine the amount of credits to add to the player's credit balance.

As previously mentioned with respect to FIG. 2, a variety of value acceptance arrangements are possible. In some implementations, the value acceptor 325 could include magnetic strip or chip card readers to accept and transfer value. The value acceptor 325 may also be configured to accept and transfer non-traditional currencies such as digital currencies. In these implementations, I/O controller 306, a processor 302, or both contain appropriate control instructions to communicate and extract value from the inserted item containing value. In some implementations, use of a magnetic strip or embedded chip card, for example a bank card, for value insertion requires the processor 302 to communicate, via the network interface 310 (described below), with devices external to a gaming system.

In some implementations, a card reader 327 may be included in gaming system 10 to accept player loyalty cards. For example, card reader 327 can extract account identifying information from the card and utilizes this information to access the associated account information stored remotely via the network interface 310. In implementations where player loyalty/player tracking systems are employed, a player's loyalty account and record of gaming activity can be stored in a networked storage location or database. The processor 302 is configured to record the player's gaming activity in memory device 304 during the duration of loyalty card insertion. When the loyalty card is removed from card reader 327, recorded gaming activity is uploaded, via the network interface 310, to the remote storage location associated with the player's account. In this manner, the player's gaming activity can be further processed and analyzed, and the player can be awarded loyalty rewards based upon his activity data.

In various implementations, an input device 115 receives a player's game inputs and communicates the player's game inputs to the processor 302. The player's game inputs may include, but are not limited to, wager amounts, pay line selections, game control signals, and cash-out signals. The input device 115 may generate signals based on button presses, touch screen activations, or voice control. The player-initiated signals are propagated to the processor 302 by the I/O controller 306. Further, the player-initiated signals may direct and inform execution of the game instructions stored in the memory device 304 and configured to be executed by the processor 302.

In some implementations, the processor 302 is configured to execute stored program code and instructions which generate random numbers or pseudo-random numbers. In some implementations, as illustrated in FIG. 3, a random number generator (RNG) 307 is a software module configured to be executed by the processor 302 for the generation of a true random or pseudo-random number. The code for RNG 307 may be stored in the memory device 304 or the storage system 312. The RNG 307 generates random numbers for use by the gaming software during game execution. In some implementations, random numbers are utilized by game software for the random selection of one or more game symbols from a set of game symbols during a game. As a non-limiting example, the set of game symbols can include numbers, letters, geometric figures, symbols, images, character, animations, blank symbols (e.g., the absence of symbols), or any other suitable graphical depiction. In various implementations, once random symbols are selected based upon the random number generated by the RNG 307, patterns of symbols are compared to determine wagering outcomes. In an alternative implementation, gaming system 10 may include a hardware based random number generator that is in communication with processor 302 to supply random numbers for game generation purposes. The hardware based random number generator may be incorporated into processor 302 or can be separate from processor 302.

In yet another implementation, the random generation of "numbers" or symbols may be performed with electromechanical components. For example, the gaming system 10 may incorporate mechanical reels rotatable about a common axis. Indicia or symbols may be positioned around the periphery of the reels. The indicia or symbols on the reels may indicate separate detectable reel stop positions. The reels can be set into a spinning/rotation motion by pulling a lever or pushing a button. In some implementations, the gaming system 10 can stop the reels by actuating, on a random timing basis, a suitable mechanical or electromechanical reel brake. When the reels stop rotating, one or more displayed stop positions of the reels are detected. Since the stop positions are associated with respective indicia or symbols, the gaming system can determine whether the combination of stop positions (i.e., translating to a combination of displayed symbols) results in a winning symbol combination.

Returning to FIG. 3, the game controller 300 controls the function and output of output devices utilized by a gaming system. In various implementations, I/O controller 306 serves as an interface unit between processor 302 and output devices, such as video processor 316, lighting controller 318, audio controller 320, and value dispenser 322.

In some implementations, the video processor 316 communicates with processor 302 to render all game graphics, video displays, and information on one or more video display units (e.g., displays 120, 130, and 134). In some implementations, the video processor 316 includes one or more processors, controllers, and/or graphics cards for processing the game images, outcomes, and animated displays and coordinating the processed data to be display between, among, or across any or all display devices. In various implementations, this may include being configured to simulate objects and the movement of objects which represent video reels containing sets of gaming symbols.

It should be appreciated that in certain other implementations where physical mechanical reels are utilized by the gaming system 10 as a game displays, reel controllers and stepper motors would be provided in lieu of or in addition to video processor 316.

In implementations which utilize cabinet lighting as described with respect to FIG. 3, a lighting controller 318 may be utilized to coordinate and control the color and timing of cabinet lighting displays with processor 302. In certain implementations which utilize sound design, processor 302 may utilize audio controller 320 to coordinate and control the sound emissions. In some implementations, audio controller 320 may include one or more audio processing cards for generating sound and for driving the one, two or more speakers 142 that may be included with a gaming system.

In various implementations, players may request to cash out remaining credit value using input device 115, which may communicate a signal to processor 302 via I/O controller 306. The signal triggers a readout of the player's credit amount and processor 302 initiates a value dispensing signal which, in turn, is communicated to value dispenser 322. In some implementations, value dispenser 322 can be controlled to issue the player's credit value using any of the types of value discussed herein. In some implementations, the player's credit value may be issued to the player via a printed and dispensed encoded paper ticket or token which the player can then exchange at a special purpose kiosk or cashier location for the monetary value encoded into the ticket or token. In some implementations, the processor 302 can direct the value dispenser 322 to issue to the player an appropriate amount of coin or bills directly to the player. Additionally, or alternatively, in some implementations, the player may have the option to electronically direct the credit value to an account associated with the player.

In some implementations, the game controller 300 may communicate with one or more devices outside the gaming system 10. For example, gaming system 10 may be connected to a larger network 350 via an information network 11 through a communication link 13, which may be the same or similar to those previously described herein. The game controller 300 may communicate with one or more central servers, controllers, or remote devices to execute games, establish credit balances, participate in bonuses, etc. In such implementations, the network communications and connections are accomplished via a network interface 310. The network interface 310 can be a digital circuit board or card installed in game controller 300 to provide network communications with external devices.

In some implementations, various additional features and functions are performed by the game controller 300. For example, the game controller 300 may be specially configured with software to track all game play events that occur on the gaming system 10. In some implementations, the game controller 300 may audit all recorded monetary transactions, including all wager amounts, game outcomes, game winnings, and game awards that occur through the value dispenser 322. Further, some implementations may include security software to assist in protecting the gaming system 10 from tamper or alteration attempts.

Gaming System Operation

The flow diagrams in FIGS. 4A-4D illustrate functionality and operations of systems, devices, processes, and computer program products according to various implementations of the present disclosure. Each block in FIGS. 4A-4D can represent a module, segment, or portion of program instructions, which includes one or more computer executable instructions for implementing the illustrated functions and operations. In some implementations, the functions and/or operations illustrated in a particular block of the flow diagrams can occur out of the order shown in FIGS. 4A-4D. For example, two blocks shown in succession can be executed substantially concurrently, or the blocks can sometimes be executed in the reverse order, depending upon the functionality involved. Additionally, in some implementations, the blocks of the flow diagrams can be rearranged in different orders. Further, in some implementations, the flow diagram can include fewer blocks or additional blocks. It is also noted that each block of the flow diagrams and combinations of blocks in the flow diagrams can be implemented by special-purpose hardware-based systems that perform the specified functions or acts, or combinations of special-purpose hardware and computer instructions.

FIGS. 4A-4D show a process flowchart illustrating an example of a method 400 of operating a gaming system (e.g., gaming system 10) in accordance with aspects of the present disclosure. FIGS. 4A-4D describe parts of a base or primary game. However, it is understood that FIGS. 4A-4D may be integrated as part of a bonus game provided from a base game or a primary game. In some implementations, one or more processors (e.g., processor 302) of the gaming system are configured, via instructions (e.g., gaming module 305) stored in a memory device (e.g., memory device 304 or storage system 312) to perform the method 400.

Figure 4A:
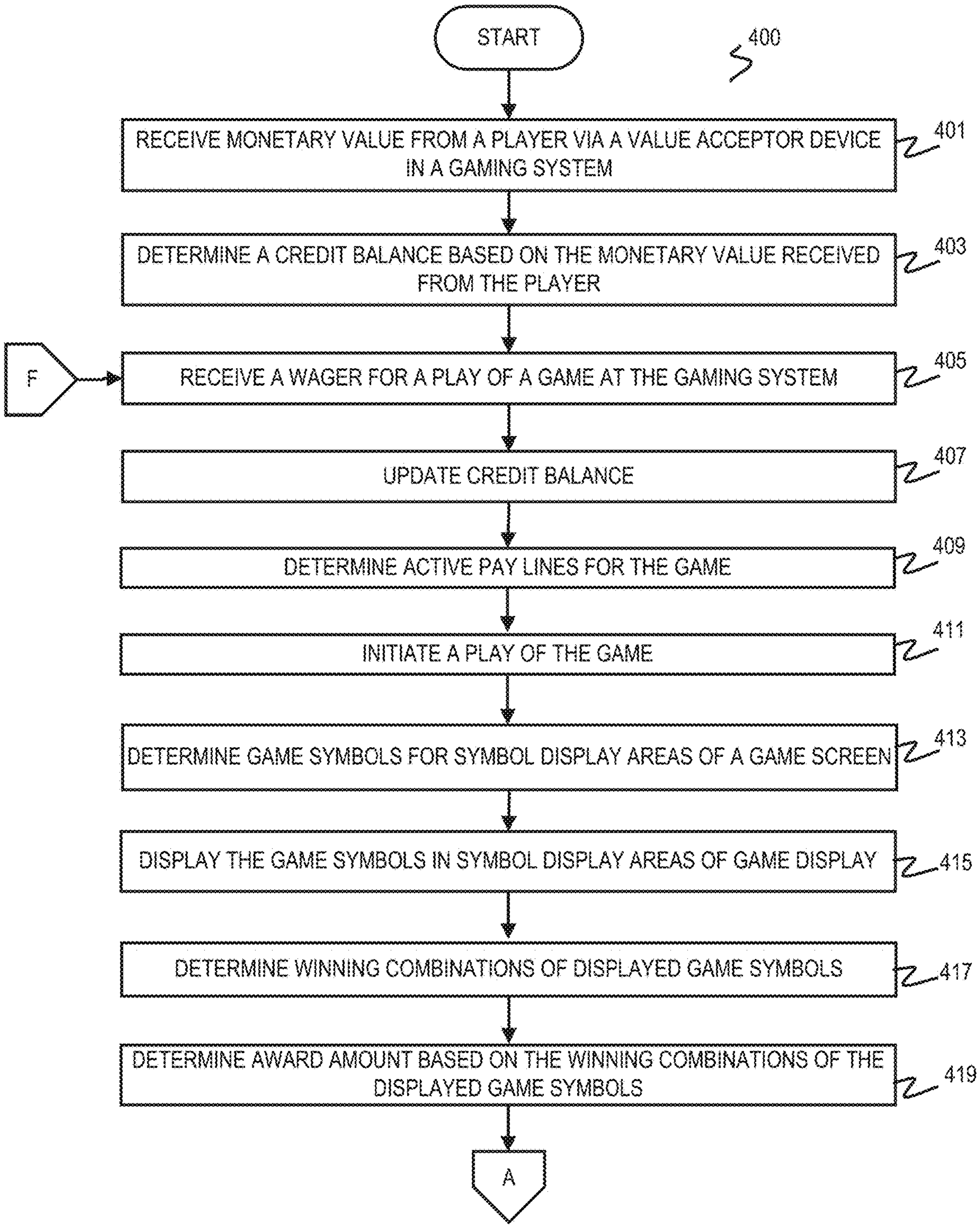
FIG. 4A shows a process flow diagram illustrating an example method of operating the gaming system in accordance with aspects of the present disclosure.

Turning to block 401 in FIG. 4A, the gaming system (e.g., gaming system 10) performing the method 400 receives a monetary value via a value acceptor device (e.g., value acceptor 325). In block 403, the gaming system determines a credit balance based on the monetary value received in block 401. In block 405, the gaming system receives a wager for a play of a game from a player via an input device (e.g., input device 115) using, e.g., the credit balance determined at block 403. In some implementations, the gaming system allows the player to place a minimum wager, a maximum wager, or other wager therebetween. In some implementations, an amount of the wager determines the value of some of the awards available from the game. In some implementations, the gaming system determines whether the credit balance determined at block 403 includes enough credits to enable the wager received at block 405. The gaming system may prevent the player from placing the wager and initiating a play of a game if the credit balance determined at block 407 is not large enough to support the wager. If enough credits are not available in the player's credit balance, the gaming system may provide the player with an option to insert additional value to obtain the minimum credit level or to cash out of the gaming system.

In some implementations, a play of a game begins with the wager at block 405 or initiation of the game at block 411, and the play of the game ends when evaluation and display of all symbol sets are complete (e.g., block 457). In another implementation, one play of a game includes blocks 405-465. In some implementations, block 463 and block 465 are not part of a play of a game. In alternative implementations, block 463 and block 465 are part of a play of a game. On the other hand, in some implementations, one play of a game comprises the blocks 427-465. In some implementations, block 463 and block 465 are not part of a play of a game. In alternative implementations, block 463 and block 465 are part of a play of a game.

At block 407, the gaming system updates the credit balance determined at block 403. In some implementations, the credit balance is updated based on the amount of the wager received at block 405. It is understood that some implementations of the method 400 may not include block 407 and that the gaming system may update player's credit balance at other times (e.g., at block 461), such as at the completion of the game.

At block 409, the gaming system determines active pay lines (a.k.a., wagered pay lines) for the game. In some implementations, depending on the amount of the wager received at block 405, the gaming system enables the player to select particular pay lines across reel symbol positions displayed in a game screen (e.g., symbol display areas 410 on reels 402 of game screen 400 in FIG. 4A). Although in some implementations, the gaming system selects the active pay lines automatically based on the wager received at block 405. It is understood that some implementations of the gaming system may not include pay lines and, as such, the method 400 may not perform block 409. For example, the gaming system may use "Ways-Pays (e.g., All-Ways pays) as an alternative to pay lines. A gaming system using Ways-Pays can determine winning combinations corresponding to game symbols that are not displayed on a same pay line. For example, the gaming system can determine an award corresponding to predetermined game symbols being displayed in symbol display areas on consecutive game reels, but not on a pay line. It is further understood that some implementations may use ways-pays as an alternative or in combination with the active pay lines determined at block 409.

At block 411, the gaming system initiates a play of the game (e.g., a base game feature or a primary game feature). The initiation can be automatically triggered in response to the wager at block 405 or it can be manually triggered in response to receiving an input via an input device. For example, the player may press a spin button on the gaming system (e.g., input device 115) to start spinning the game reels (e.g., reels 502 in FIG. 5A) of the gaming system (or randomly generating symbols using other methods) for the play of the game.

At block 413, the gaming system determines, using a random number generator (e.g., random number generator 307), game symbols for the game from one or more sets of symbols. In implementations in which the game reels are rendered using a video display (e.g., display 130), the random number generator can be used to select the game symbols from the one or more sets of game symbols (e.g., game symbols 314). As non-limiting examples, the sets of game symbols can include graphical indicators depicting numbers, letters, geometric figures, poker cards, images, characters, animations, blanks (e.g., the absence of symbols), or the like. Additionally, the sets of game symbols may include modifier symbols, such as cash award symbols (e.g., 100 credits or $10) and award multiplier symbols (e.g., a 10× increase in an award of a winning combination). Further, the sets of game symbols may include special or designated symbols (e.g., wild symbols, trigger symbols, scatter symbols, collectable symbols, free game symbols, etc.). In some implementations, types of game symbols included in the sets may be different. A first set may include symbols, a second set may include "wild" symbols (e.g., Joker symbols), and/or a third set may include trigger symbols that can trigger a bonus game or bonus feature. While the game reels are described above are described as being rendered by a video display, it is understood that some implementations may instead use electro-mechanical reels where, using the random number generator, the gaming system controls mechanical reels to select symbols by physically rotating to a randomly-selected stop position.

At block 415, the gaming system causes the display device (e.g., display 120) to display the game symbols determined at block 413. For example, in some implementations in which the game reels are rendered using a video display, the gaming system may populate all visible symbol display areas (e.g., symbol display areas 510A-510 in FIG. 5A) displayed by the one or more reel (e.g., reels 502) displayed in the game screen using the game symbols determined at block 415. At block 417, the gaming system determines winning symbol combinations of the game symbols displayed in the symbol display areas at block 415, if any. At block 419, the gaming system determines an award amount based on the winning combinations determined at block 417, as well as any additional award associated with game symbols displayed in the active paylines, if any. In some implementations, the gaming system evaluates the game symbols displayed across active pay lines determined at block 409 for winning combinations at block 417, while not evaluating game symbols outside the active pay lines. For example, a pay table (e.g., pay table 315) associated with the gaming system may indicate that a sequence of at least three of the same game symbols (when evaluated left-to-right, right-to-left, and/or scattered) is a winning combination and award a predetermined award corresponding to such winning combination. Accordingly, the gaming system may evaluate the generated game symbols for such sequence of symbols (e.g., three Ace ("A") symbols). If the gaming system generated at least three game symbols in a sequence along an active pay line on adjacent symbol display areas of the reels or the reels, the gaming system may determine that the three game symbols are a winning symbol combination based on the predetermined pay table. While the present example describes a sequence of three game symbols, it is understood that the pay table may correlate various winning symbol combinations to awards. In some implementations, the pay table may indicate that as few as one game symbols may be associated with an award. Alternatively, two or more game symbols may be used to form winning symbol combinations that result in an award.

Figure 4B:
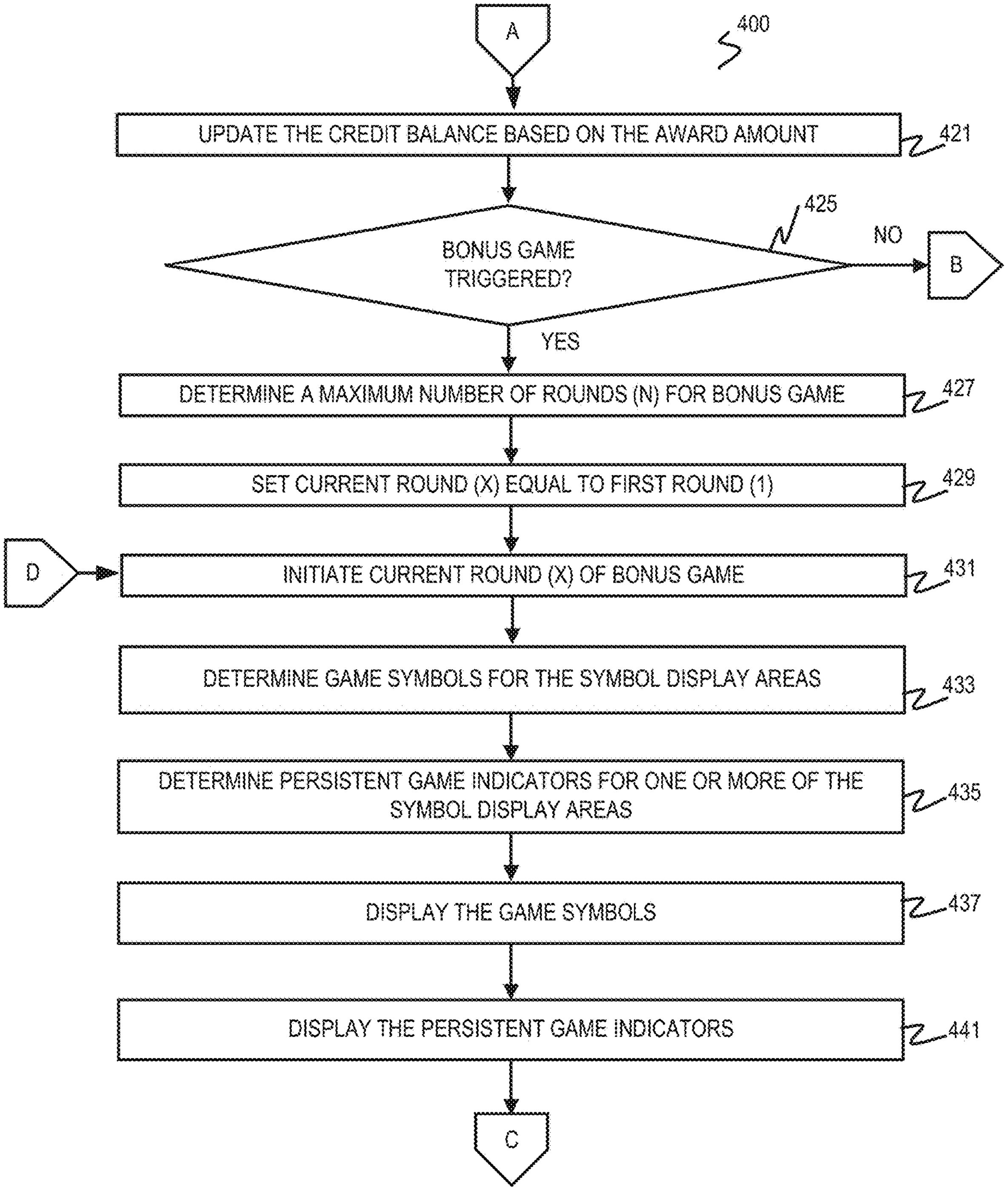
FIG. 4B shows a process flow diagram illustrating an example method of operating the gaming system in accordance with aspects of the present disclosure.

Turning to FIG. 4B, as indicated by off-page connector "A," at block 421, the gaming system updates the credit balance determined at block 407 based on the award amount determined at block 419. It is understood that some implementations of the method 400 may not include block 407 and that the gaming system may update player's credit balance at other times (e.g., at block 461), such as at the completion of the game.

At block 425, the gaming system determines whether a bonus game (e.g., a second game feature) has been triggered. In some implementations, the gaming system triggers the bonus game based on, for example, an output from a bonus controller. In some implementations, the gaming system randomly triggers the bonus game based on, for example, an output from the random number generator. In some implementations, the gaming system randomly triggers a bonus game after occurrence of a threshold number of events since trigging a previous bonus game (e.g., after a number of wagers, a number of game iterations, or a period of time). In some such implementations, the gaming system triggers the bonus game based on determining that the symbols displayed at block 415 include a trigger symbol, a number of trigger symbols, a particular combination of trigger symbols, a particular arrangement of trigger symbols, or a particular sequence of trigger symbols. For example, the gaming system may trigger the bonus game if a sequence of three trigger symbols (e.g., trigger symbols 513 in FIG. 5C) are displayed in a particular reel (e.g., reel 502A of a game screen 500 in FIG. 5C). While the game triggered at block 425 is referred to as a "bonus game," it is understood that such game can be a game feature or a sub-game initiated at block 411. It is also understood that, in some implementations, the method 400 can start after block 425, without such game being triggered by the game initiated at block 411, such that blocks 427-465 provide a standalone game.

Figure 4C:
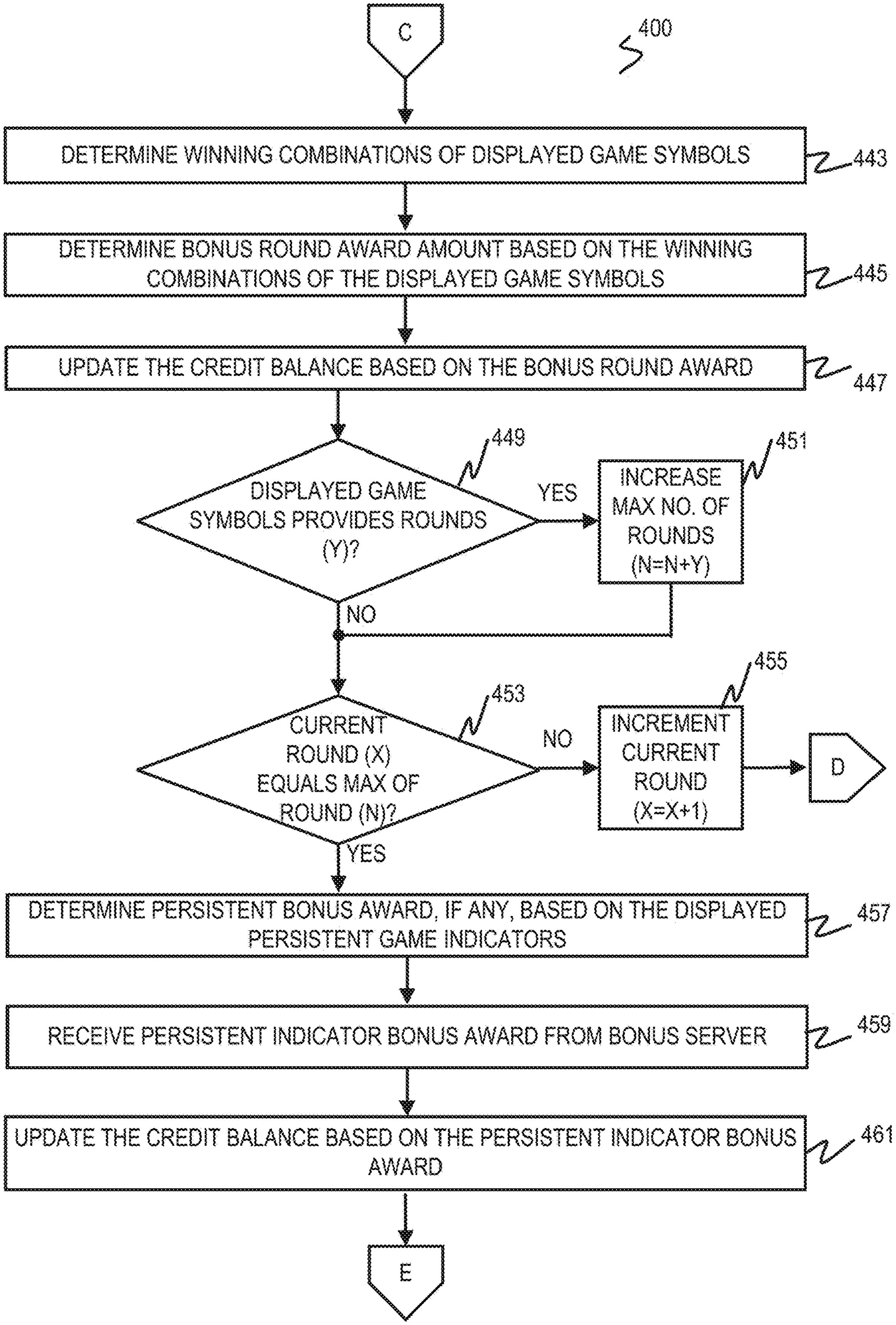
FIG. 4C shows a process flow diagram illustrating an example method of operating the gaming system in accordance with aspects of the present disclosure.
Figure 4D:
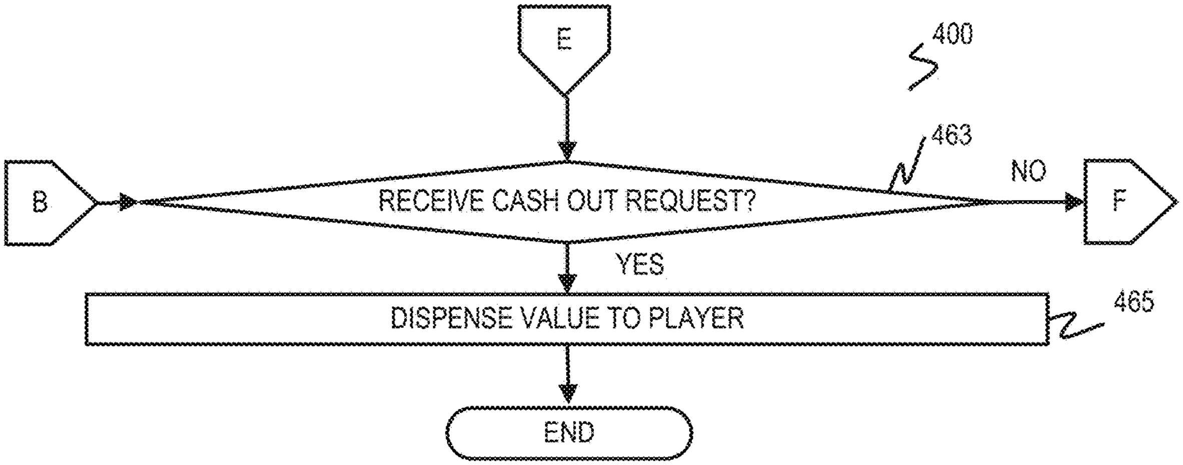
FIG. 4D shows a process flow diagram illustrating an example method of operating the gaming system in accordance with aspects of the present disclosure.

If the gaming system determines that the bonus game has not been triggered (e.g., block 425 in "No"), then the method 400 proceeds to block 463 of FIG. 4D, as indicated by off-page connector "B." On the other hand, if the gaming system determines the bonus game has been triggered (e.g., block 425 is "Yes,") then at block 427, the gaming system determines a maximum quantity (N) of rounds (e.g., spins, stages, trials) for the bonus game triggered at block 425. In some implementations, the quantity of rounds in the bonus game is a fixed quantity (e.g., 10 free spins as indicated by spin indicator 525 in FIG. 5C or some other suitable quantity). In some implementations, the quantity of rounds varies. For example, different triggers (e.g., symbols or combinations of symbols) in the base game may provide different quantities of the rounds of the bonus game. Additionally or alternatively, in some implementations the rounds of the bonus game correspond to an amount of a wager received from the player. For example, a larger wager received at block 405 may grant a greater quantity of rounds in a bonus game (e.g., a player can incrementally increase the wager to incrementally increase the number of rounds in the bonus game. In some implementations, the maximum quantity of rounds of the bonus game is determined based on an amount of an additional wager receive from the player at block 427 (e.g., an additional bet input using button 505E.) In some implementations, the gaming system may randomly determine the maximum quantity of rounds in the bonus game based on the players wager (e.g., one credit provides one round), based on the game symbols determined at block 413, and/or based on a selection of a quantity from a predetermined range (e.g., a random selection of between 10 rounds and 20 rounds or some other suitable range).

At block 429, the gaming system can set a current round (X) (e.g., as illustrated by spin count indicator 528 in FIG. 5D) to a first round (X=1) of the maximum quantity (N) of rounds of the bonus game determined at block 427. At block 431, the gaming system can initiate the bonus game. The initiation can be automatically triggered in response to the triggering of the bonus game at block 425 or it can be manually triggered in response to receiving an input via an input device. For example, the player may press a spin button on the gaming system (e.g., input device 115) to start spinning the game reels (e.g., reels 502 in FIG. 5A) of the gaming system (or randomly generating symbols using other methods) for the round of the bonus game.

At block 433, the gaming system determines (e.g., using the random number generator 307) game symbols for the symbol display areas (e.g., symbol display areas 510 of the game screen 500) using one or more symbol sets (e.g., game symbols 314). The game symbol determination can be performed in a same or similar manner to that previously described above with regard to block 413. In some implementations, the game symbols included in the symbol sets can be the same or similar to those describe previously herein. And, in some implementations, the game symbols in the symbol sets used at block 433 can be different than the game symbols used at block 413. For example, the game symbols used at block 433 can include different types and combinations than the symbols sets used at block 413. Additionally, the game symbols included in the symbol sets of block 433 can include symbols that, alone or in combination, provide additional rounds for the bonus game. For example, some game symbols may award free additional frees spins. Further, the game symbols included in the symbol sets of block 433 can include symbols that, alone or in combination, provide additional awards. In some implementations, the game symbols include bonus pay symbols that provide a bonus award. For example, the gaming system can provide a progressive bonus award when a predetermined scatter pay symbol is displayed in particular arrangements, sequences, or locations of the game display (e.g., in a first reel 702A and a third reel 702C of game display 700 in FIG. 7C).

At block 435, the gaming system determines persistent game indicators for one or more of the symbol display areas (e.g., symbol display areas 510 of the game screen 500). The persistent game indicators (e.g., persistent bonus indicators) may be, for example: a symbol that is adjacent to, underlaying, or overlaying a game symbol, a halo around a game symbol, a frame that surrounds a game symbol, or a background displayed behind a game symbol.

In some implementations, the gaming system can randomly determine (e.g., using the random number generator 307) the persistent bonus indicator in a same or similar manner to that previously described above with regard to block 413. For example, the gaming system can determine the persistent game indicators by selecting one or more sets of symbols (e.g., game symbols 314), which can be different than the sets of symbols including the game symbols, including persistent game indicators and blank symbols. In other implementations, the gaming system can randomly determine a number of persistent game indicators to be displayed in the current spin (X) and randomly assign the number of persistent game indicators to individual symbol display areas lacking a persistent bonus indicator from a previous round. In some other implementations, the persistent game indicators can correspond to particular ones of the game symbols determined at block 433. For example, if such a particular game symbol is determined at block 433 for one or more symbol display areas (e.g., a "Fire" symbol, such as symbols 705E and 705G in symbol display areas 710E and 710G of game screen 700 in FIG. 7A), then the gaming system can also display a persistent game indicator (e.g., persistent game indicators 729E and 729G) at the symbol display areas (e.g., symbol display areas 710E and 710G).

At block 437, the gaming system causes the display device (e.g., display 120) to display the game symbols determined at block 433 in the symbol display areas in a same or similar manner to that described above with regard to block 415. In some implementations, the game symbols replace game symbols previously displayed in the symbol display areas, but do not replace any persistent game indicators already displayed in the symbol display areas. In other implementations, the game symbols replace game symbols previously displayed in the symbol display areas, but do not replace game symbols that share symbol display areas with persistent game indicators. Rather, the persistent game indicators can lock game symbols in their respective symbol display areas from round-to-round during the bonus game.

At block 441, the gaming system causes the display device (e.g., display 120) to display the persistent game indicators determined at block 437 in the symbol display areas in a same or similar manner to that described above with regard to block 433. Differently from the game symbols, in implementations, the persistent game indicators do not replace game symbols, game symbols, or persistent game indicators already displayed in the symbol display areas. Instead, the persistent game indicators are displayed concurrently with the game symbols and the persistent game indicators are held locked in their respective symbol display areas from round-to-round during the bonus game.

Turning to FIG. 4C, as indicated by off-page connector "C," at block 443, the gaming system determines winning symbols or symbol combinations of the game symbols displayed in the symbol display areas at block 435 in a same or similar manner to that previously described at block 417. The winning symbol combinations may be determined using a pay table (e.g., pay tables 315), which can be the same or different than the pay table used at 417. In some implementations, winning symbol combinations of bonus pay symbols displayed in particular locations (e.g., a first game reel and a third game reel) may pay an additional award (e.g., a bonus award from a progressive bonus pool maintained by bonus server 3).

At block 445, the gaming system determines a bonus round award amount based on the winning combinations of game symbols determined at block 443 of the current round (X), if any, as well as any additional award symbols displayed in the active paylines. At block 447, the gaming system updates the credit balance determined at block 421 based on the bonus round award determined at block 445. It is understood that some implementations of the method 400 may not include block 447 and that the gaming system may update player's credit balance at other times (e.g., at block 461), such as at the completion of the game.

At block 449, the gaming system determines whether the game symbols displayed at 435 provide additional rounds (Y) for the bonus game triggered at block 425. For example, the gaming system may determine that one of the symbol display area displayed a game symbol corresponding to an award of three additional free spins for the bonus game (e.g., "3 Free Spins!"). If so (e.g., block 449 is "Yes"), then at block 451, the gaming system can increase the maximum quantity of rounds of the bonus game (e.g., N=N+Y). For example, if at block 427 the gaming system determined that the maximum quantity of free spins for the bonus game was ten (e.g., N=10), and if at block 449 the gaming system determined that the displayed game symbol provided three additional spins (e.g., Y=3), then at block 451, the game device would increase the maximum quantity of spins to 13 (e.g., N=10+3=13). The method 400 would then proceed to block 453. If at block 449, the gaming system determined that the game symbols did not provide additional rounds of the bonus game (e.g., block 449 is "No"), then the method 400 proceeds to block 453 without modifying the maximum quantity of rounds of the bonus game determined at block 427.

At block 453, the gaming system determines whether the current round (X) of the bonus game is equal to the maximum quantity of rounds of the bonus game (N) determined at block 427 or block 451. In other words, the gaming system determines whether the current round is the last round of bonus game. If the current round is not equal to the maximum quantity of rounds of the bonus game (e.g., block 453 is "No"), then the method 400 proceeds block 455, at which the gaming system increments value of the current round, and the gaming system iteratively initiates another round of the bonus game triggered at block 425, as indicated by off-page connected "D" linking block 455 to block 431 in FIG. 4B. For example, at block 453, if the current spin is the first spin (e.g., X=1) and the maximum spins is ten (N=10), then the current spin is not the last spin and the bonus game. As such, at block 455, the gaming system would increment the current spin (X=1+1=2) and proceed to block 431 to initiate the current spin (X=2) of the bonus game.

If the current spin is equal to the maximum spin (e.g., block 453 is "Yes"), then at block 457 the gaming system determines persistent indicator bonus awards for the bonus game triggered at block 425 based on the persistent game indicators displayed in the game screen. In accordance with aspects of the present disclosure, the persistent game indicators accumulate in the symbol display areas during the rounds of the bonus game (e.g., over rounds 1 to round N). In some implementations, the persistent indicator bonus awards are based on the quantity of persistent game indicators accumulated during the bonus game. For example, individual persistent game indicators (e.g., ones not included in a predetermined winning combination) can each pay a predetermined award, which may be a fixed amount (e.g., 50 credits) or a variable amount (e.g., a multiple of the wager received at block 405).

In some implementations, the persistent indicator bonus awards can be based on predetermined winning sequences of the persistent game indicators accumulated during the bonus game. For example, the winning combinations of the persistent game indicators may be a vertical sequence of persistent game indicators (e.g., all symbol display areas 510A, 510F, 510K in a single game reel 502A displaying the persistent game indicators 528 in FIG. 5I). In some implementations, the winning sequences of the persistent game indicators may be a predetermined quantity (e.g., two or more) of persistent game indicators accumulated in the symbol display areas 510 of the game reels (e.g., game reels 502A, 502B, and 502E displaying the persistent game indicators 529 in FIG. 5I). In some implementations, the gaming system may determine a greater persistent indicator bonus award based on a quantity of game reels having three or more symbol display areas with the persistent bonus indicators. Hence, in some implementations, the gaming system may pay a first persistent indicator bonus award if a single game reel (e.g., game reel 502A) has all of its symbol display areas (e.g., symbol display areas 510A, 510F, and 510K) displaying persistent game indicators (e.g., persistent game indicators 529A, 529F, and 529K). And, the gaming system may pay a second, greater persistent indicator bonus award if two game reels (e.g., game reels 502A and 502B) have all of their symbol display areas (e.g., symbol display areas 510A, 510F, and 510K and symbol display areas 510B, 510G, and 510L) displaying persistent game indicators (e.g., persistent game indicators 529A, 529F, and 529K and persistent bonus indicators 529B, 529 G, and 529L). Further, the gaming system may pay a third, even greater persistent indicator bonus award if three game reels (e.g., game reels 502A, 502B, and 502E) have all of their symbol display areas (e.g., symbol display areas 510A, 510F, and 510K, symbol display areas 510B, 510G, and 510L, symbol display areas 510E, 510JG, and 510O) displaying persistent game indicators (e.g., persistent game indicators 529A, 529F, and 529K, persistent game indicators 529B, 529G, and 529L, and persistent game indicators 529E, 529J, 529O).

At block 459, the gaming system may receive the value of the persistent indicator bonus award determined at block 457 from a bonus server (e.g., bonus server 3) via one or more communication links (e.g., communication links 13) forming a network (e.g., network 11) game multiple gaming systems (e.g., gaming systems 10), which may be arranged in banks (e.g., banks 7). For example, the bonus server can be a progressive bonus server, such as previously described herein, the accumulates the value of the persistent indicator bonus award from wagers made at the multiple gaming systems. At block 461, the gaming system updates the credit balance determined at block 407, block 421, or block 447 based on the persistent indicator bonus award amount determined at block 457. In some implementations, the above may work with less than all of the symbol display areas.

Turning to FIG. 4D, as indicated by off-page connector "E," at block 463, the gaming system determines whether it received a request to end game play or "cash out" via an input device (e.g., input device 115) of the gaming system. In such event (e.g., block 463 is "Yes"), then at 465, the gaming system dispenses a value to the player, through a value dispenser (e.g., value dispenser 322) based on the player's gaming credit balance and the method 400 ends. On the other hand, if the gaming system has not received a request to end game play or cash out (e.g., block 463 is "No"), the method 400 returns to block 405 in FIG. 4A, as indicated by off-page connector "F". The gaming system may receive, via a player input device, a wager for another play of the game and continue method 400 from block 405. However, in some implementations, the wager may not be accepted if the player has fewer credits in the credit balance determined at block 461 than the player's selected wager amount at block 405.

FIGS. 5A-5I show example images of a game screen 500 displayed by a gaming system (e.g., gaming system 10) in accordance with aspects of the present disclosure. More specifically, FIGS. 5A-5I illustrate examples of screen shots the game screen 500 that may be displayed by a display device (e.g., display device 120) by one implementation of the gaming system encompassed by the method illustrated in FIGS. 4A-4D.

Figure 5A:
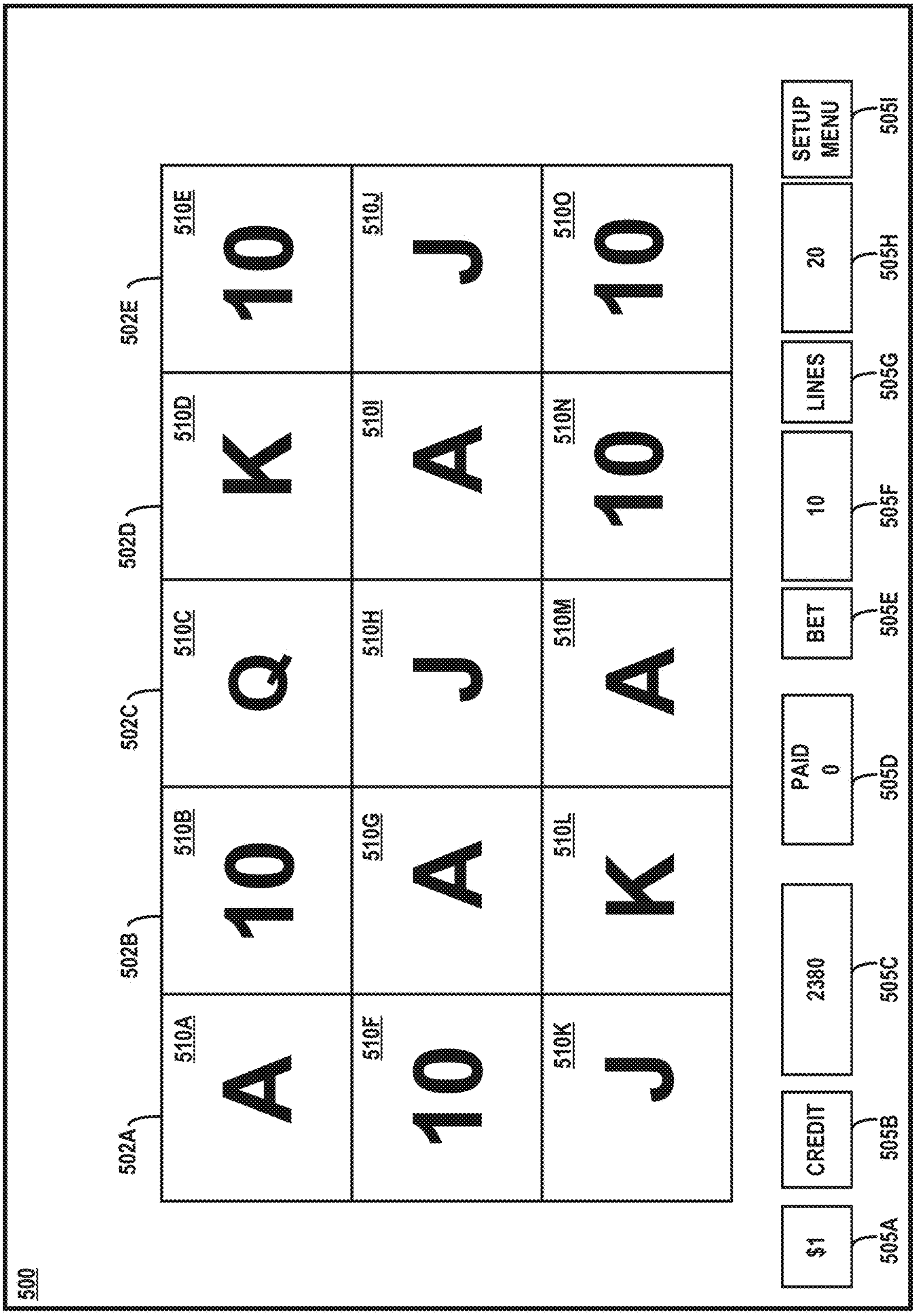
FIG. 5A shows a picture of a game screen displayed by a gaming system in accordance with aspects of the present disclosure.
Figure 5B:
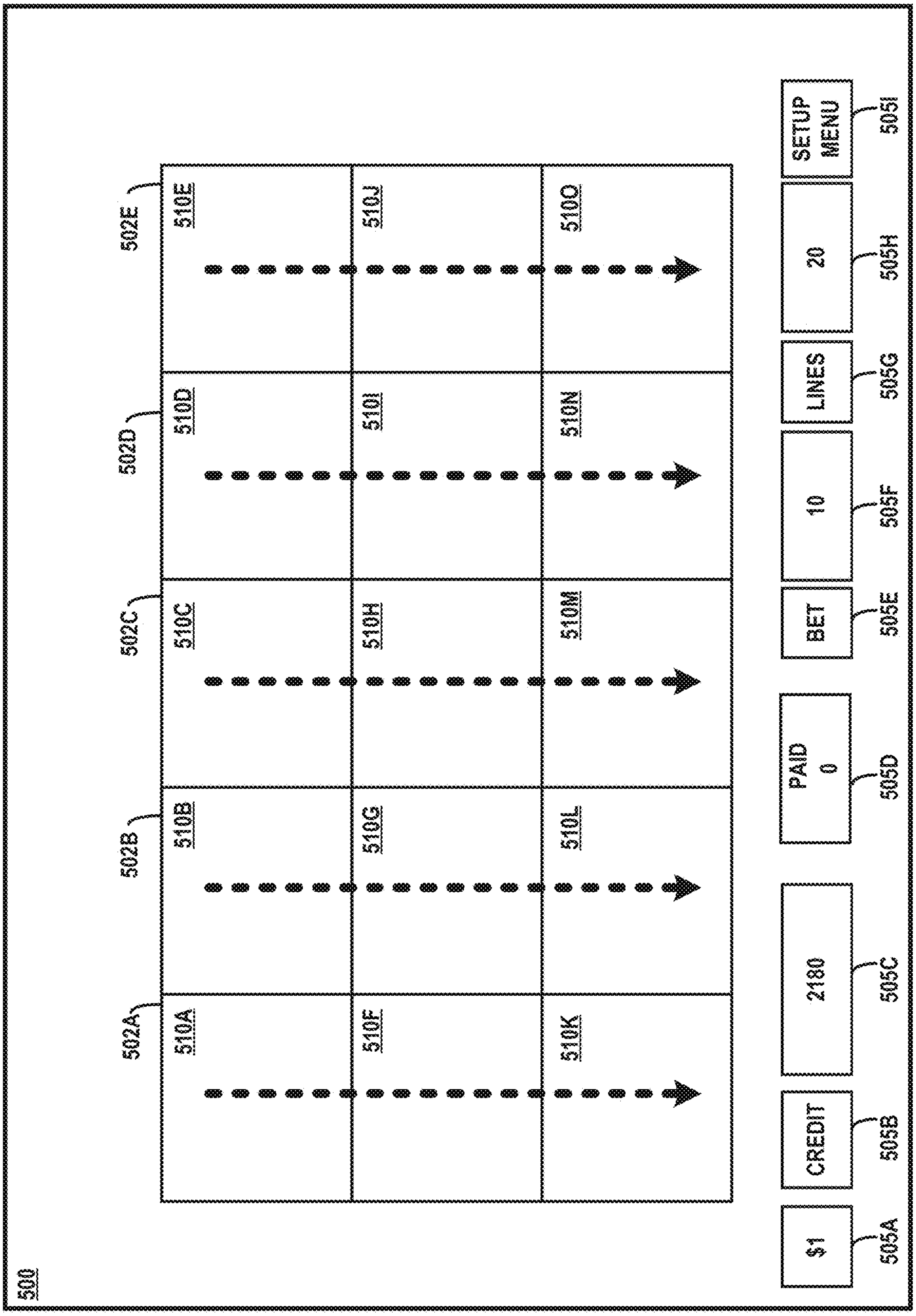
FIG. 5B shows a picture of a game screen displayed by a gaming system in accordance with aspects of the present disclosure.

FIG. 5A illustrates the game screen 500 including game reels 502A-502E. In implementations, the game reels 502A-502E comprise a set of virtual video game reels arranged substantially side by side so as to form a rectangular array. It should be appreciated that game reels 502A-502E can be displayed with different amounts of separation or no separation. The game reels 502A-502E include symbol display areas 510A-510O (a.k.a., symbol display positions). As illustrated in FIG. 5A, the symbol display areas 510A-510O are arranged so as to provide the appearance of a set of five game reels so as to represent a slot machine. In some implementations, such as illustrated in FIG. 5A, the five game reels may be arranged so as to visibly show four symbol display positions on each of the five game reels 502A-502E. For example, the symbol display areas 510A-510O are each associated with positions on the reels 502A-502E, respectively. More specifically, in the example illustrated in FIG. 5A, the symbol display areas 510A, 510F, and 510K are associated with reel 502A; symbol display areas 510B, 510G, and 510L are associated with reel 502B; symbol display areas 510C, 510H, and 510M are associated with reel 502C; symbol display areas 510D, 510I, and 510N are associated with reel 502D; and symbol display areas 510E, 510J, and 510O are associated with reel 502E. When viewed together, reels 502A-502E appear like a 3-row by 5-column reel array (i.e., matrix) in game screen 500. In other implementations, smaller (e.g., 3×3) or larger (e.g., 5×5) visible arrays of the symbol display areas can be displayed. It is understood that, while FIGS. 5A-5I show the game screen 500 as including gridlines delineating boxes around the symbol display areas 510A-510O for the sake of clarity, it is understood that implementations of the game screen 500 may not include some or all of the gridlines or boxes. For example, the symbol display areas 510A-510O may not be displayed within separate boxes (as shown, e.g., in FIG. 7A).

The reels 502A-502E may display game symbols (e.g., symbols 10, J, Q, K, and A) in their respective symbol display areas 510A-510E that have been determined by the gaming system (such as previously described with regard to block 413 in FIG. 4A). In some implementations, the reels 502A-502E are associated with respective sets of game symbols (e.g., game symbols 314), where each set of symbols includes a number of game symbols (e.g., a pool of game symbols). The sets of symbols can include the same or different game symbols, and such game symbols may be selectable at different frequencies. As previously described herein, the game symbols can include graphic indicators, pay symbols, modifier symbols, special symbols or designated symbols.

In addition to the game reels 502A-502E, the game screen 500 can also include several information areas and buttons 505A-5051. These information areas and buttons 505A-5051 are illustrated in a particular arrangement, but may be arranged in any suitable manner in different implementations. In some implementations, game screen 500 may include more or fewer display areas and buttons 505A-5051 than illustrated.

Information area 505A illustrates an example value of one credit (e.g., $0.01) for the game displayed in game screen 500. Information areas 505B and 505C illustrate an example of the amount of the player's available credits. For example, the value displayed in information 505C ("2380") may represent credit balance determined based on a monetary value received from a player via a value acceptor device (such as previously described with regard to blocks 401 and 403 of FIG. 4A). Information area 505D illustrates the amount of credits a player has won (such as previously described with regard to block 419 in FIG. 4B). For example, as illustrated in FIG. 5G, information area 505D shows "100" credits have been won. Notably, because FIG. 5A illustrates the start of a play of a game, the information area 505D shows zero credits have been won.

Button 505E illustrates a software button that the player can select to place wager (e.g., a bet, such as previously described with regard to block 405 in FIG. 4A). It should be appreciated that the functionality of button 505E may also be replicated or replaced with a hardware button on the gaming system 10. Information area 505F illustrates an amount of the wager made at information area 505E. For example, as illustrated in FIG. 5A, information area 505F indicates the player has selected to wager 10 credits.

Information area 505G illustrates a software button that the player can select to determine how many pay lines to wager on (such as previously described with regard to block 409 in FIG. 4A). It should be appreciated that the functionality of button 505G may also be replicated or replaced with a hardware button on the gaming system 10. Information area 505H illustrates a number of pay lines selected by the player using information area 505G. For example, as illustrated in FIG. 5A, information area 505G indicates the player selected to wager on 10 pay lines. Button 5051 illustrates a software button that the player can select to obtain information about the game, change certain aspects of the game, obtain help, place an order, etc.

To start a gaming session using the gaming system, a player provides the gaming system with a deposit of value, using one of the suitable mechanisms discussed above (such as previously described with regard to block 401 in FIG. 4A). The gaming system can validate the deposit of value received from the player. The gaming system can then issue credits (or gaming credits) to the player based on the received value (such as previously described with regard to block 403 in FIG. 4A). The credits enable the player to place wagers on the play of the game and initiate a play of a game (such as previously described with regard to blocks 405-411 in FIG. 4A). The gaming system may provide a visual indication of the player's credit balance to the player as discussed above in information area 505C.

To initiate the play of the game during the gaming session, the player activates or presses one or more appropriate buttons on the gaming system to deduct credits necessary to play the game and to identify the wager received from the player (such as previously described with regard to block 405 in FIG. 4A). The gaming system may deduct the appropriate credits from the player's credit balance after the wager or at any suitable time (such as previously described with regard to block 407 in FIG. 4A). In some implementations, the gaming system may also update the player's credit meter (information area 505C) to reflect the player's available credit balance. As an example, FIG. 5B shows the player's credit meter (information area 505C) decremented by 200 credits from 2380 to 2370 to reflect the 10 credit wager the player placed on 20 pay lines for the play of the game. Along with receiving the player's wager, the gaming system may receive pay line selections or other game functions the player wishes to activate in exchange for the wager (such as previously described with regard to block 409 in FIG. 4A). In some implementations, the gaming system automatically selects the pay lines for the player. The player may also actuate a game start button, a spin button, or a lever to initiate a play of a game (e.g., input device 115, such as previously described with regard to block 411 in FIG. 4A).

After initiating a game (e.g., at block 411 in FIG. 4A) and prior to displaying the symbols for such game in the symbol display areas 510A-510O (e.g., at block 415 in FIG. 4A), the gaming system may cause the game screen 500 to display the game reels 502A-502E spinning, for example, to simulate the movement of mechanical game reels. For example, as represented by the dashed lines in FIG. 5B, the gaming system may show a display of spinning reels for each of the reels 502A-502E. The spinning may appear to occur in a vertical top to bottom direction or in a vertical bottom to top direction (not shown), or in a combination of vertical directions (not shown). It is understood that other displays can be used that do not simulate game reels of a slot machine. For example, the gaming system can display the game reels spinning in more than one direction, or the gaming system may not provide any display depicting the reels spinning. It is also understood that games other than a spinning reel slot machine may be provided using the game reels 502. For example, in some implementations, the gaming system may display symbols the symbol display areas 510 in the reels 502 randomly changing or changing in some pattern. Also, while the symbol display areas 510A-510O are illustrated with boxes defined by gridlines, it should be appreciated that in some implementations, such boxes or gridlines are not visible to the player. It should also be appreciated that in some implementations, the symbol display areas are other shapes or not defined shapes and may not be associated with the reels 502A-502E. Further, it should be also appreciated that the game shown in the game screen 500 is merely representative and may have more or fewer game elements (e.g., reels, symbol display areas, symbols, etc.) shown in the game screen 500.

Figure 5C:
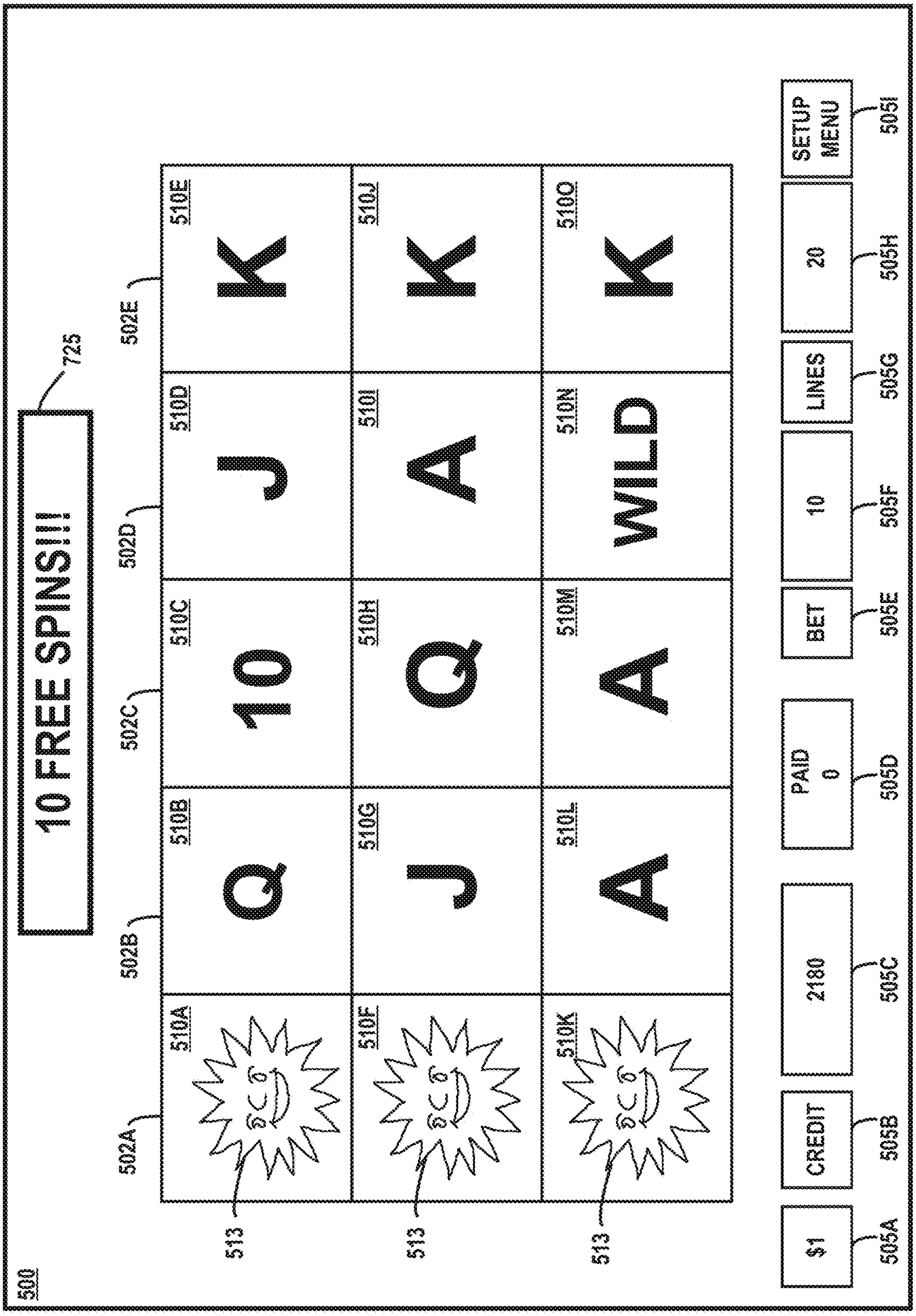
FIG. 5C shows a picture of a game screen displayed by a gaming system in accordance with aspects of the present disclosure.
Figure 5D:
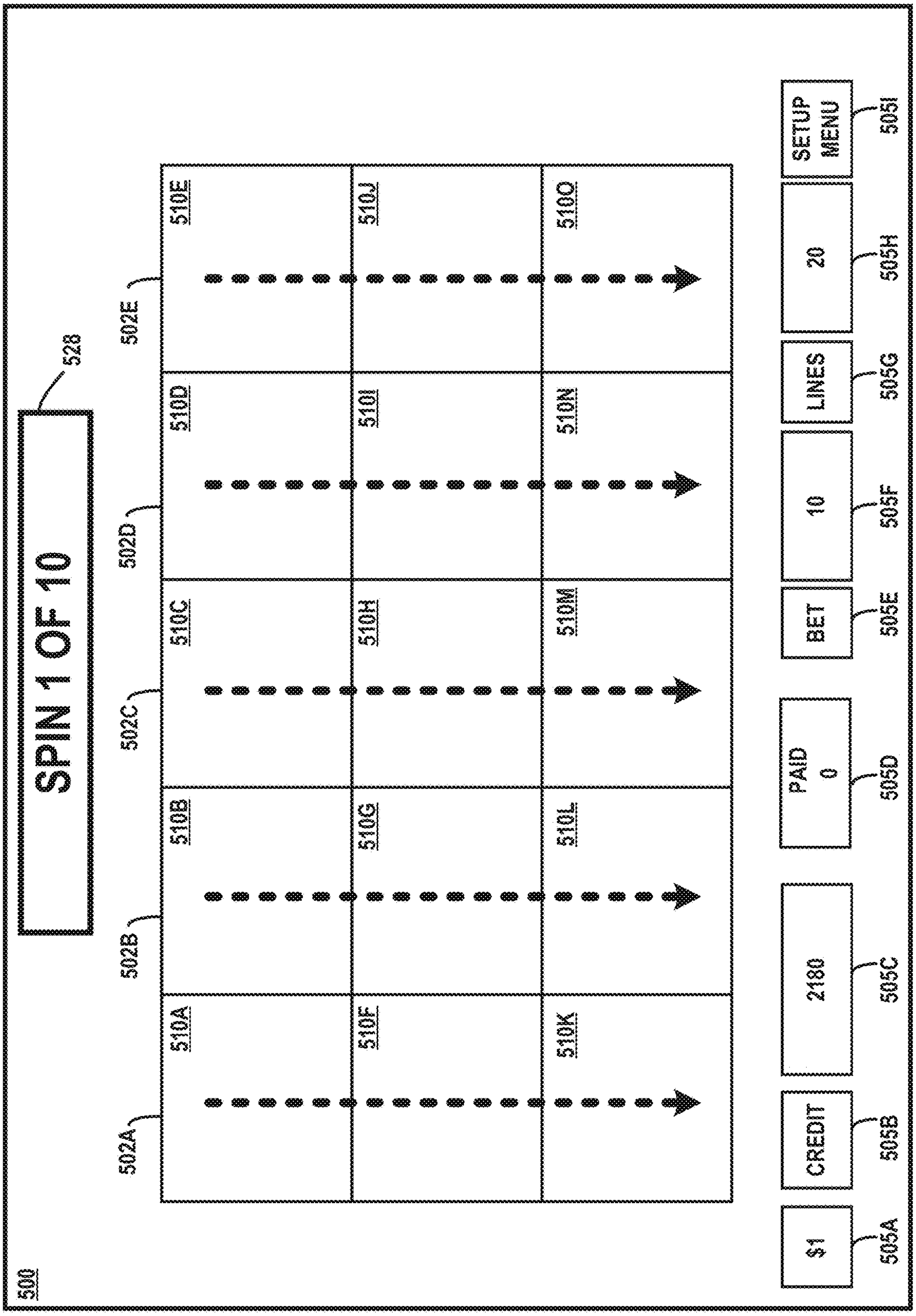
FIG. 5D shows a picture of a game screen displayed by a gaming system in accordance with aspects of the present disclosure.

As illustrated in FIG. 5C, the gaming system can display game symbols (e.g., game symbols 314) for the game in symbol display areas 510A-510O of the game reels 502A-502E. The gaming system can display the game symbols in the symbol display areas 510A-510O of the game reels 502A-502E after the game reels 502A-502E spinning in FIG. 5B have stopped. The gaming system can randomly determine game symbols from the respective sets of symbols for the game reels 502A-502E (such as previously described with regard to block 413 in FIG. 4B). The gaming system can evaluate of the game symbols determined for the game reels 502A-502E for winning symbol combinations (such as previously described with regard to block 417 in FIG. 4A). As noted above, the player may have wagered on one or more pay lines (such as 20 pay lines shown in information area 505H). In some implementations, at least the active pay lines (e.g., wagered pay lines) are evaluated for winning symbol combinations. Any suitable quantity of pay lines may be used to evaluate winning symbol combinations. It should be appreciated that the displayed combinations of game symbols shown in FIG. 5C are merely for explanatory purposes and the gaming system may randomly generate any suitable combination of game symbols based on defined sets of game symbols respectively associated with the reels 502A-502E.

FIG. 5C illustrates one example of the randomly-determined game symbols that may be displayed by the symbol display areas 510A-510O after the reels 502A-502E stop spinning. In the present example, the gaming system may evaluate the displayed game symbols and determine whether, based on a pay table, the symbol display areas 510 of the 502A-502E include a winning combination of the sequential symbols corresponding to an award.

The gaming system may update the information area 505D to reflect the award or amount of credits the player has won, if any, and may also update the player's gaming credit balance 505C in accordance with the calculated award amount for the play of the game (such as previously described with regard to block 421 in FIG. 4B). In some implementations, the play of the game may end if the combination of game symbols displayed in FIG. 5C does not trigger a bonus game (such as previously described with regard to block 425 in FIG. 4B). The player may continue the gaming session (e.g., play another consecutive play of the game) by executing another play of the game (such as previously described with regard to block 405 in FIG. 4A). That is, the player may place another wager and start a new play of the game as noted above. However, continued game play is dependent of the quantity of credits remaining in the player's credit balance (e.g., as displayed in information area 505C). The player may also choose to cash out. In such an instance, the gaming system provides the player a value based on the player's credit balance using any of the value items discussed above (bills, coins, vouchers, etc.).

On the other hand, the game may not end if the gaming system evaluates the game symbols displayed in symbol display areas 510A-510O and, as illustrated in FIG. 5C for example, determines that the symbol display areas 510A, 510F and 510K include bonus trigger symbols 513 (e.g., as previously described with regarded to block 425 in FIG. 4B). For example, the sequence of bonus trigger symbols 513 in game reel 502A may trigger a bonus game having ten rounds (e.g., frees spins), as indicated by a spin indicator 525 in FIG. 5C. In some implementations, the gaming system may trigger the bonus game when the symbol display areas 510A-510 display one or more of the bonus trigger symbols 513 in one or more predetermined symbol display areas 510A-510O. For example, the gaming system may trigger the bonus game when it determines that a bonus triggering symbol 513 is displayed in symbol display area 510A of the game screen 500. In some implementations, the gaming system may trigger the bonus game when the symbol display area 510A-510 display a predetermined sequence or combination of bonus trigger symbols 513. For example, the gaming system can trigger a bonus game when sequence of three adjacent bonus trigger symbols 513 appear on a wagered pay line or a single game reel (e.g., in symbol display areas 510A, 510F, and 510K of reel 502A). Further, in some implementations, the bonus trigger symbols 513 can correspond to an award of one or more rounds for the bonus game, rather than triggering the game providing a fixed quantity of rounds (e.g., 10 free spins). For example, each of the bonus trigger symbols 513 can correspond to five rounds in the bonus game. While not illustrated, it is understood that the bonus trigger symbols 513 can include an indicator indicating a quantity of rounds associated with each of the symbols. Additionally, while the present example describes a game awarding rounds of the bonus game allowing play of a corresponding quantity of rounds of the bonus game, it is understood that the quantity of rounds of the bonus game in some implementations are, instead, based on the wager received from the player (e.g., at block 405 in FIG. 4A), based an additional wager received from the player for the bonus game, or based on a random selection from a range (e.g., such as previously described with regard to block 427 in FIG. 4B).

After triggering the bonus game and prior to displaying the symbols for such bonus game in the symbol display areas 510A-510O, the gaming system may cause the game screen 500 to display the reels 502A-502E spinning for a first round of the bonus game (e.g., "Spin 1 of 10"). For example, as represented by the dashed lines in FIG. 5D, the gaming system may show a display of spinning reels for each of the reels 502A-502E, in a same or similar manner to that described above with regard to FIG. 5B. Additionally, the gaming system can display a spin count indicator 528 displaying count of the current round in the awarded quantity of rounds of the bonus game (e.g., "Spin 1 of 10").

Figure 5E:
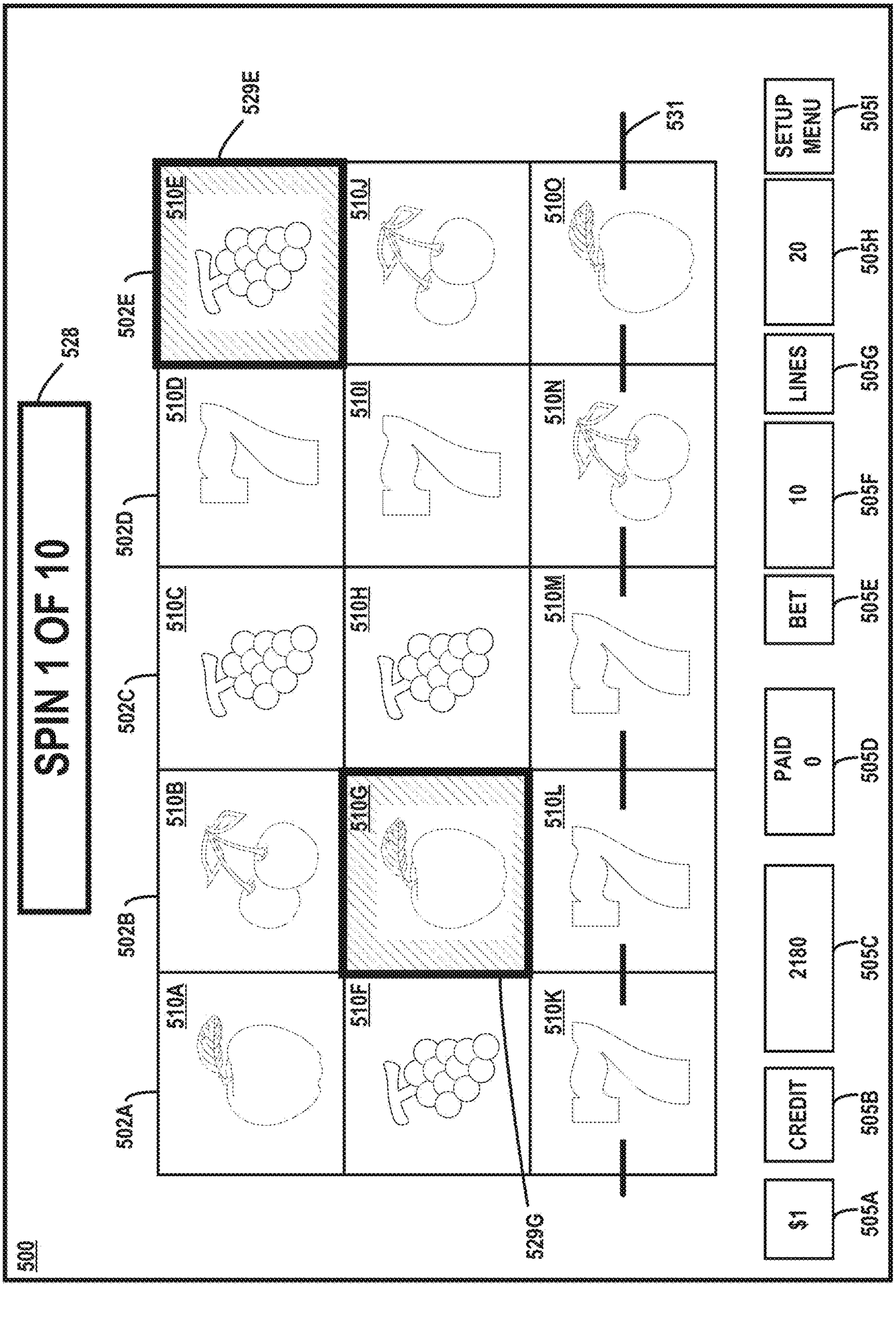
FIG. 5E shows a picture of a game screen displayed by a gaming system in accordance with aspects of the present disclosure.

As illustrated in FIG. 5E, the gaming system can display game symbols for the bonus game in symbol display areas 510A-510O of the game reels 502A-502E for the bonus game triggered by the bonus trigger symbols 513 in FIG. 5C. The gaming system can display the symbols in the symbol display areas 510A-510O of the reels 502A-502E in replacement of the symbols displayed in FIG. 5C after the reels 502A-502E stopped the spinning. The gaming system can randomly determine game symbols from associated sets of game symbols for the reels 502A-502E (such as previously described with regard to block 433 in FIG. 4B) and display the game symbols in the symbol display areas 510A-510O (such as previously described with regard to block 435 in FIG. 4B). The sets of game symbols can be the same or different than those used for FIG. 5C.

As also illustrated in FIG. 5E, the gaming system can determine and display persistent game indicators 529 for the bonus game in symbol display areas 510A-510O of the game reels 502A-502E. For example, in the illustrated example, the gaming system can display the persistent game indicators 529E and 529G in the symbol display areas 510E and 510G of the reels 502B and 502E in addition to the game symbols displayed in FIG. 5E after the reels 502A-502E stopped the spinning. In some implementations, the gaming system can randomly determine persistent game indicators symbols from associated sets of persistent game indicators for the symbol display areas 510A-510O of the reels 502A-502E (such as previously described with regard to block 437 in FIG. 4B) and display the persistent game indicators in the symbol display areas 510A-510O (such as previously described with regard to block 441 in FIG. 4B). In other implementations, the gaming system can randomly determine a quantity of persistent game indicators for the current spin of the bonus game and randomly assign the quantity of persistent game indicators to particular symbol display areas 510A-510O not already displaying a persistent bonus indicator. In still other implementations, the gaming system can randomly determine a quantity of persistent game indicators for the current spin of the bonus game and randomly assign the quantity of persistent game indicators to particular symbol display areas 510A-510O that display a particular bonus symbol and are not already displaying a persistent bonus indicator.

The gaming system can evaluate the game symbols determined for the reels 502A-502E for winning symbol combinations (such as previously described with regard to block 443 in FIG. 4C). As noted above, the player may have wagered on one or more pay lines (such as 20 pay lines shown in information area 505H). In some implementations, at least the active pay lines (e.g., the wagered pay lines) are evaluated for winning symbol combinations. For example, FIG. 5E illustrates an example of a winning sequence of game symbols ("7-7-7") in pay line 531. Any suitable quantity of pay lines may be used to evaluate winning symbol combinations. It should be appreciated that the displayed symbol combinations shown in FIG. 5E are merely for explanatory purposes and the gaming system may randomly generate any suitable combination of symbols based on defined sets of game symbols associated with the reels 502A-502E.

Figure 5F:
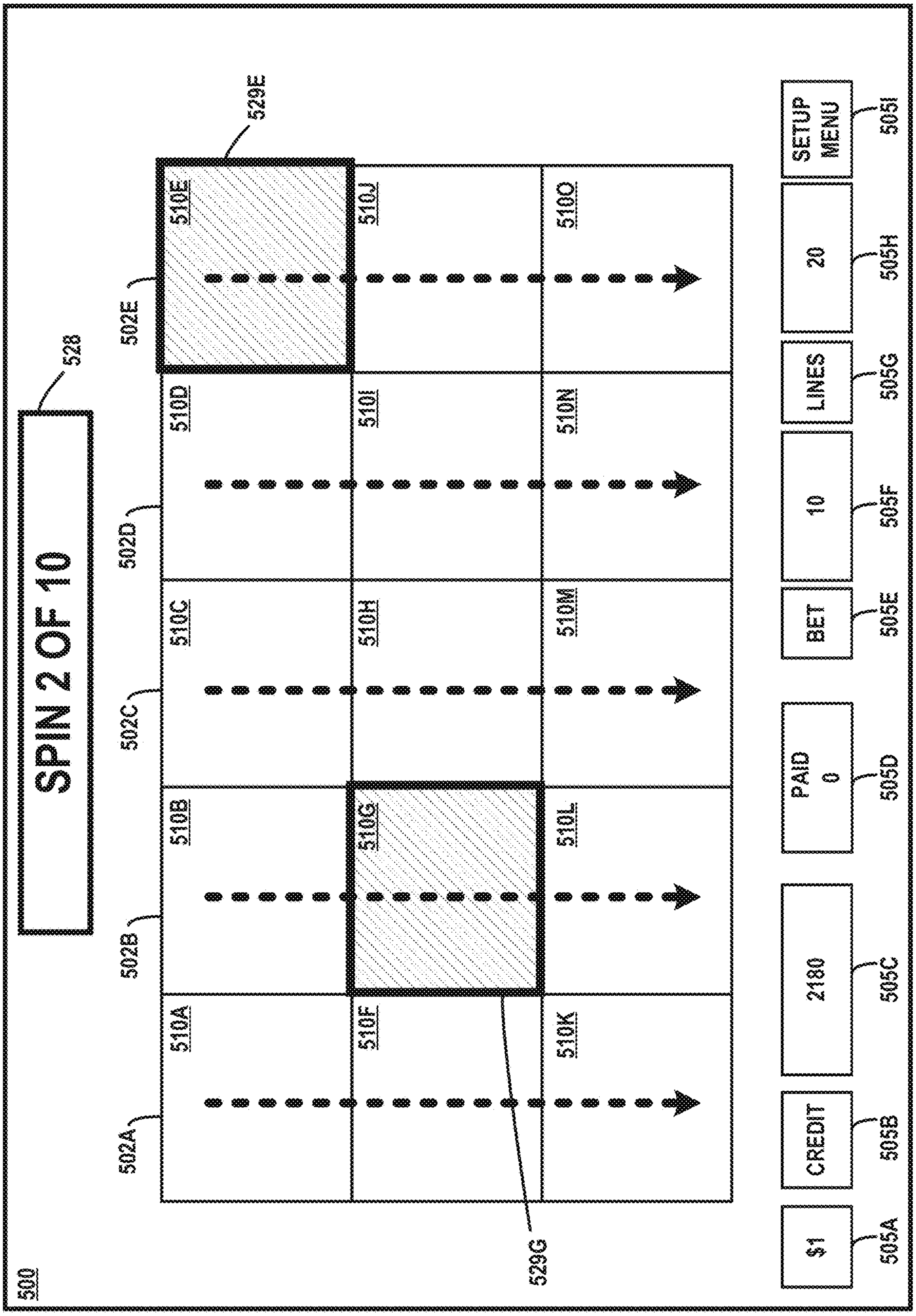
FIG. 5F shows a picture of a game screen displayed by a gaming system in accordance with aspects of the present disclosure.
Figure 5G:
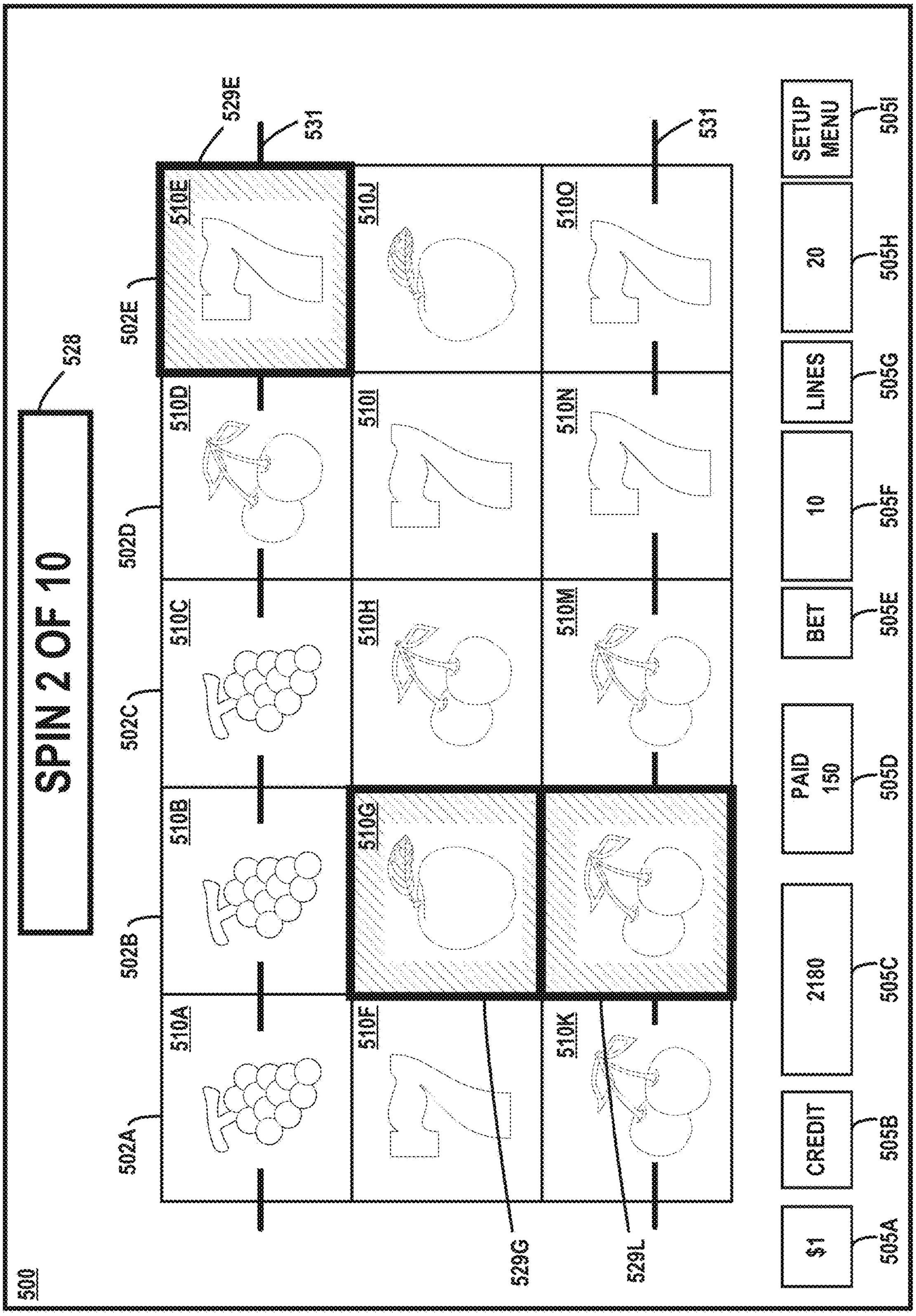
FIG. 5G shows a picture of a game screen displayed by a gaming system in accordance with aspects of the present disclosure.

As illustrated in FIG. 5F, the gaming system can initiate a second round of the bonus game ("Spin 2 of 10") prior to displaying the symbols for the second round in the symbol display areas 510A-510O, the gaming system may cause the game screen 500 to display the reels 502A-502E spinning for a second spin of the bonus game, as represented by the dashed lines in FIG. 5F, the gaming system may show a display of spinning reels for each of the reels 502A-502E, in a same or similar manner to that described above with regard to FIG. 5B. Additionally, the gaming system can display a spin count indicator 528 displaying count of the current round in the maximum quantity of rounds of the bonus game (e.g., "Spin 2 of 10," such as previously described with regard to blocks 427, 449, 451, 453, and 455). Further, while the game reels 502A-502E are spinning, the gaming system can cause the screen 500 to display the persistent game indicators 529E and 529G in their respective symbol display areas 510E and 510G, representing that such indicators are locked in position from round-to-round (e.g., from spin 1 to spin 2), while the game symbols are replaced from round-to-round by the spinning of the game reels 502A-502E. As noted previously, in some implementations, the game symbols in symbol display areas 510E and 510G including the persistent game indicators may also remain locked from round-to-round such that they are not replaced by new game symbols.

As illustrated in FIG. 5G, the gaming system can determine, display, and evaluate game symbols for second round the bonus game in a same manner as describe above with regard to FIG. 5E. For example, in the present example, the gaming system may determine that symbol display areas 510K, 510L, and 510M display winning sequences of three "Grape" symbols and three "Cherry" symbols along the wagered pay lines 531, which may, for example, pay wards of 100 credits and 50 credits, respectively. The gaming system may display an indication of the awards in information area 505D of FIG. 5G. Additionally, the gaming system determines and displays one or more persistent game indicators 529 for the second round of the bonus game in a same manner as describe above with regard to FIG. 5E. For example, in FIG. 5G, additional persistent game indicator 529L determined for the second round is displayed at symbol display area 510L, in addition to persistent game indicators 529E and 529G, which are locked at symbol display areas 510E and 510G from the previous rounds of the bonus game.

Figure 5H:
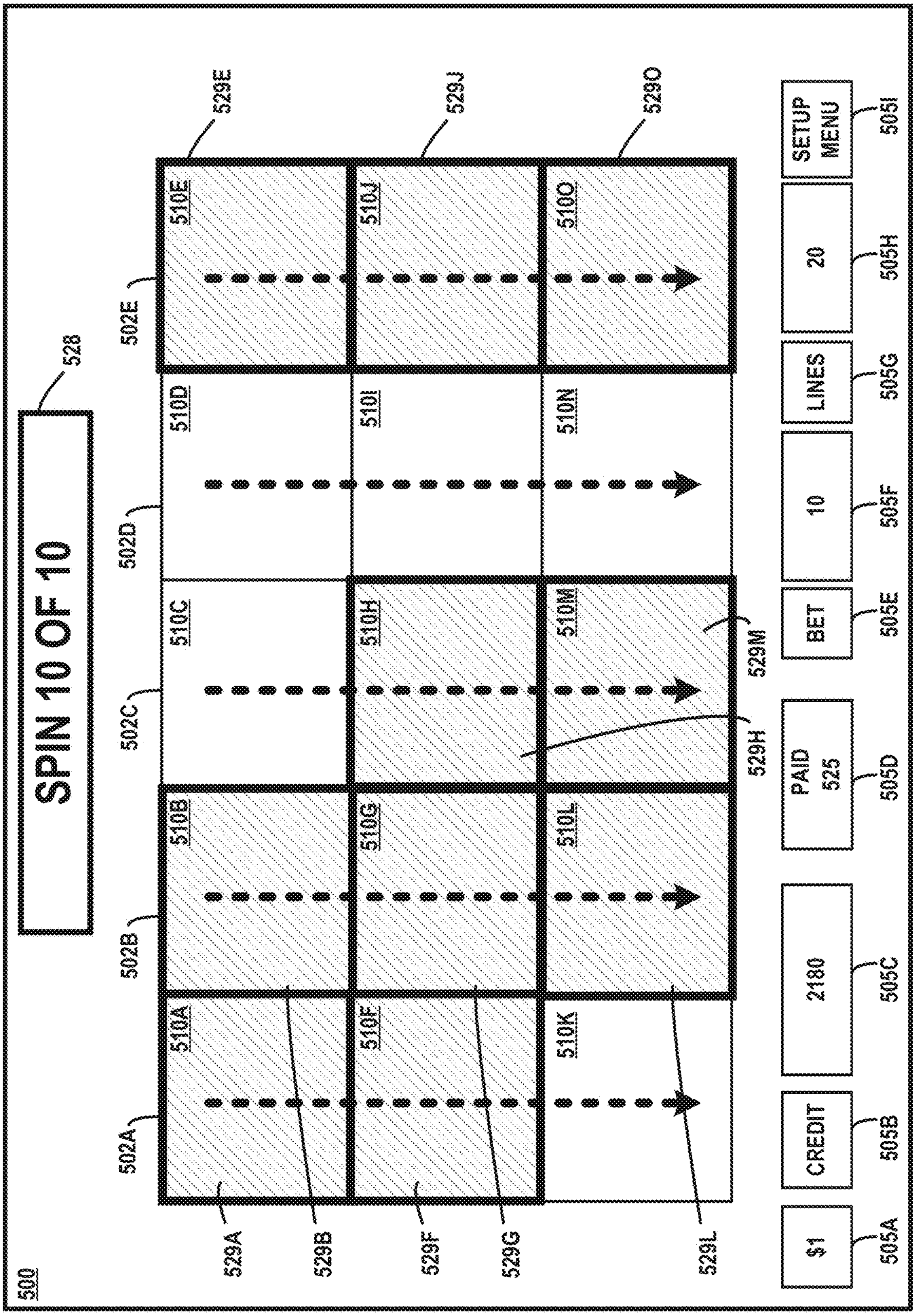
FIG. 5H shows a picture of a game screen displayed by a gaming system in accordance with aspects of the present disclosure.

The gaming system may iteratively repeat a number of rounds (e.g., spins) of the bonus game up to the maximum quantity of spins determined for the bonus game. Over the number of rounds of the bonus game, the game may accumulate additional awards from winning combinations of game symbols, as indicated in information 505D of FIG. 5H (e.g., showing 525 credits, which is increased from the 150 credits in FIG. 5G. As illustrated in FIG. 5H, the spin count indicator 528 shows the current spin is the tenth spin of ten spins ("Spin 10 of 10"), wherein additional persistent game indicators 529A, 529B, 529F, 529H, 529J, 529M, and 529O locked in symbol display areas 510A, 510B, 510F, 510J, 510M, and 510O have accumulated during rounds 3-9 of the bonus game (not shown) in addition to persistent game indicators 529E, 529G, and 529 which were locked at symbol display areas 510E, 510G, and 510L during the first two spins of the bonus game. For the tenth round of the bonus game, prior to displaying the symbols for the tenth round in the symbol display areas 510A-510O, the gaming system may again cause the game screen 500 to display the reels 502A-502E spinning for tenth round of the bonus game, as represented by the dashed lines in FIG. 5H, the gaming system may show a display of spinning reels for each of the reels 502A-502E, in a same or similar manner to that described above with regard to FIG. 5B. Additionally, the gaming system can display a spin count indicator 528 displaying count of the current round in the awarded quantity of rounds of the bonus game (e.g., "Spin 10 of 10"). Further, while the game reels 502A-502E are spinning, the gaming system can cause the screen 500 to display the persistent game indicators 529A, 529B, 529E, 529F, 529G, 529H, 529J, 529L, 529M, and 529O in their respective symbol display locations, representing that such indicators were locked in position from round-to-round (e.g., from spins 1-9), while the game symbols were replaced from round-to-round.

Figure 5I:
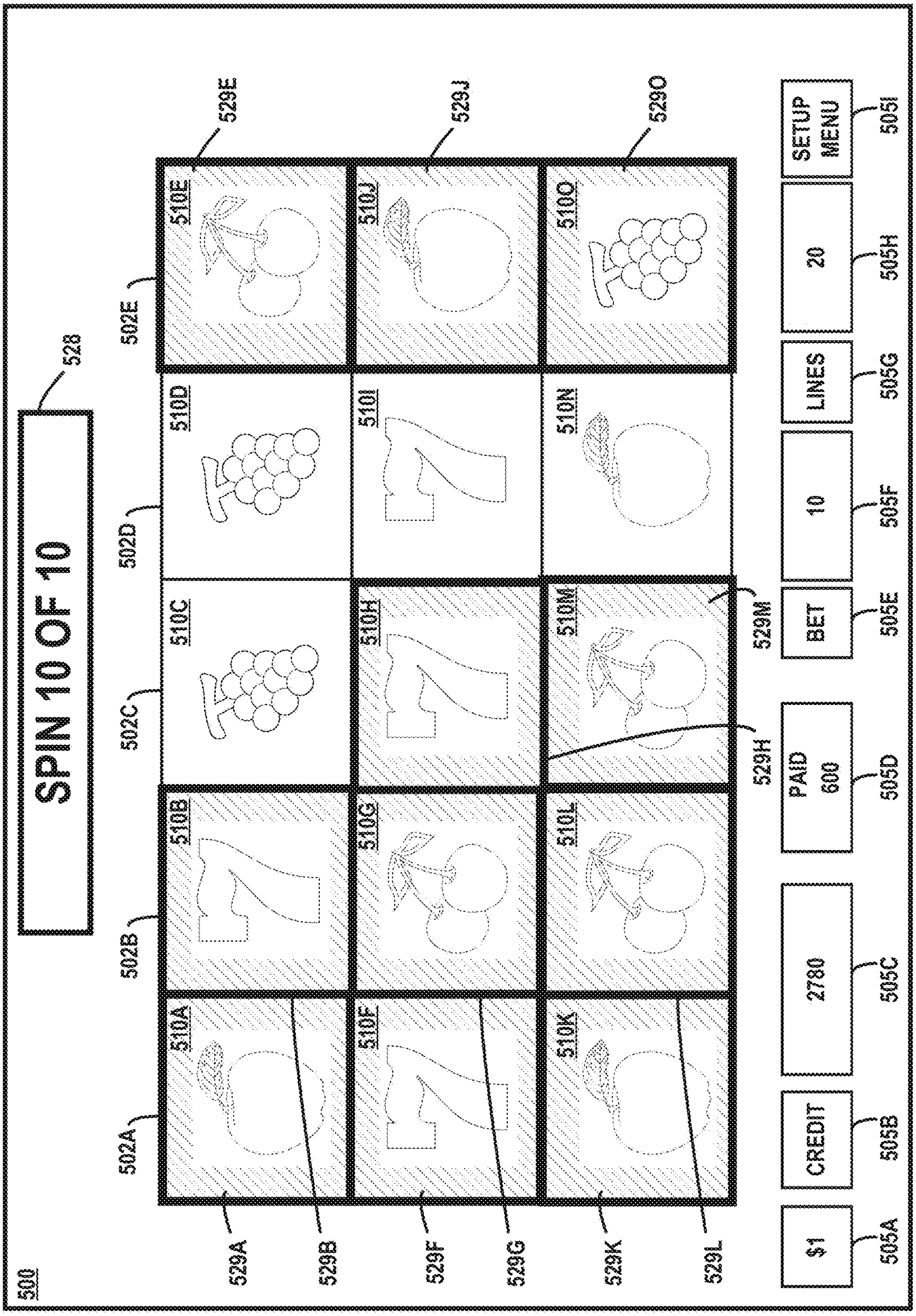
FIG. 5I shows a picture of a game screen displayed by a gaming system in accordance with aspects of the present disclosure.

As illustrated in FIG. 5I, the gaming system can determine, display, and evaluate game symbols for tenth round of the bonus game in a same manner as described above with regard to FIG. 5E. Additionally, the gaming system determine and display one or more persistent game indicators 529 for the tenth round of the bonus game in a same manner as describe above with regard to FIGS. 5E and 5G. For example, in FIG. 5I, new persistent bonus indicator 529K determined for the tenth spin is displayed at symbol display area 510K, in addition to persistent game indicators 529A, 529B, 529E, 529F, 529G, 529H, 529J, 529L, 529M, and 529O, which were locked at symbol display areas 510A, 510B, 510E, 510F, 510G, 510J, 510L, 510M, and 510O from the previous spins of the bonus game. As spin 10 is the maximum round of the bonus game, the gaming system may evaluate the persistent game indicators 529 in the symbol display areas 510 to determine a persistent indicator bonus award (e.g., as previously described with regard to block 457 in FIG. 4C.).

In some implementations, the gaming system can determine the persistent indicator bonus awards based on the quantity or arrangement of the persistent game indicators 529A, 529B, 529E, 529F, 529G, 529H, 529J, 529L, 529M, and 529O. For example, as illustrated in FIG. 5I, reels 502A, 502B, 502E include sequences of three adjacent persistent game indicators 529A, 529F, and 529K, persistent bonus indicators, 529B, 529G, 529L, and persistent game indicators 529E, 529J, and 529O, respectively (which may, e.g., pay an award of 75 credits, increasing information area 505D from 525 credits to 600 credits). It is understood that, in some implementations, may provide a persistent indicator bonus award for reels having three or more persistent game indicators. For example, in FIG. 5I, each of the reels 502A, 502B and 502E may pay a corresponding persistent indicator bonus award, whereas persistent game indicators 529H and 529M in game reel 502C do not form a sequence of three or more indicators and, therefore, are not a sequence forming a winning sequence of persistent game indicators that may correspond to a persistent indicator bonus award. In some implementations, the persistent indicator bonus awards may increase in proportion to the quantity of game reels 502 having winning sequence of the persistent game indicators 529. For example, each winning sequence of persistent game indicators 529 on individual game reels 502 may pay the same persistent indicator bonus award. In other implementations, the persistent indicator bonus awards may increase disproportionally for each additional game reel 502. For example, a combination of three persistent game indicators 529 in a first game reel 502A may pay a first persistent indicator bonus award (e.g., a small bonus), accumulating a combination of three persistent game indicators 529 in two game reels 502A, 502B may pay a second persistent indicator bonus award that is substantially greater than the first persistent indicator bonus award (e.g., a large bonus), and accumulating a combination of three persistent game indicators 529 in three game reels 502A, 502B, and 502E may pay a third persistent indicator bonus award that is substantially greater than the second persistent indicator bonus award (e.g., a grand bonus). Moreover, in some implementations, individual persistent game indicators (e.g., not members of a winning sequence of the persistent game indicators), such as persistent game indicators 529H and 529M, can provide an award (e.g., a multiple of the wager shown in information area 505A).

Figure 6:
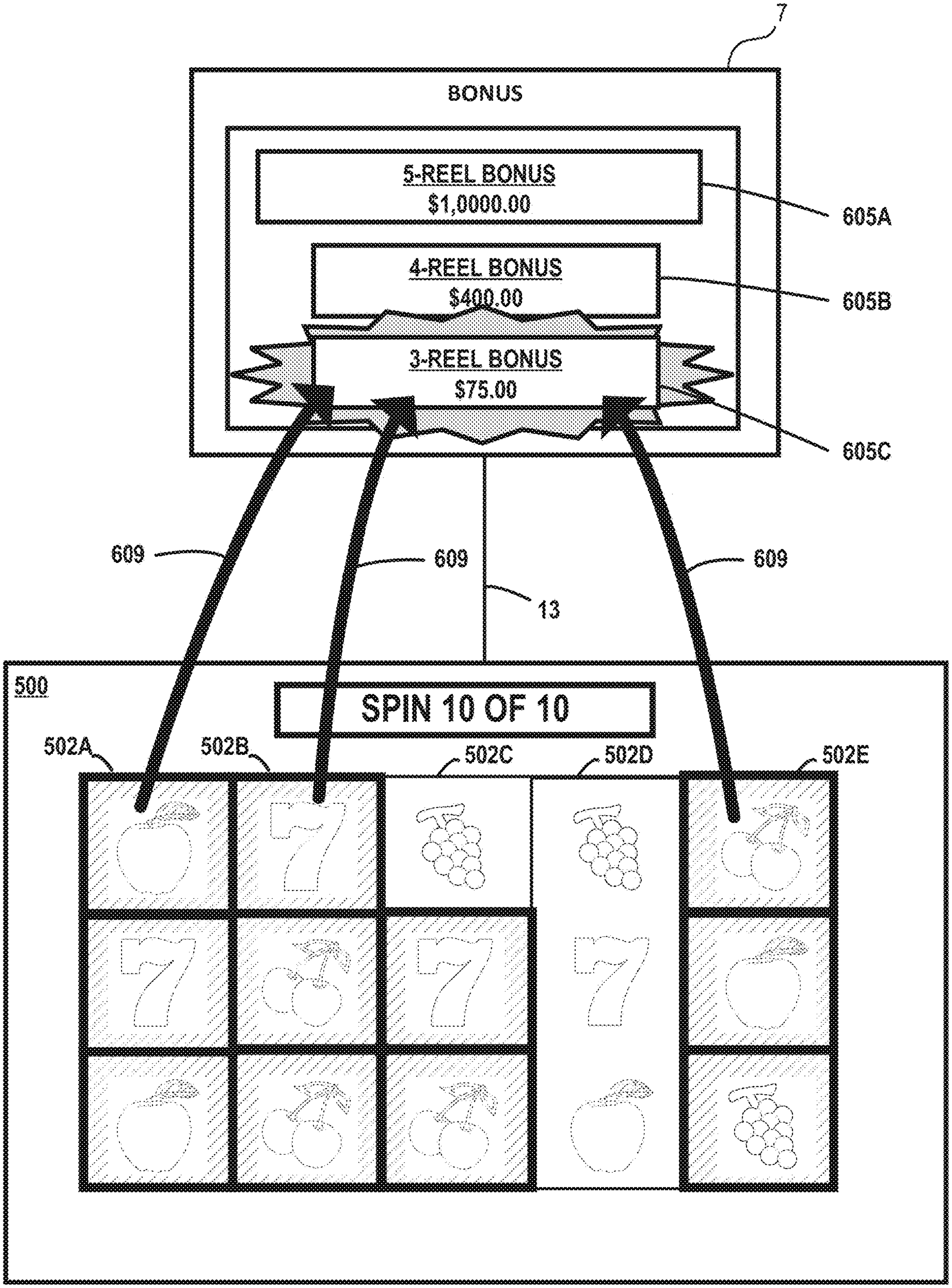
FIG. 6 shows a picture of a game screen and a bonus display by a gaming system in accordance with aspects of the present disclosure.

FIG. 6 shows a picture of a game screen 500 of a gaming system (e.g., gaming system 10) and a bonus display 5 connected in communication by a communication link 13, each of which can be the same or similar to those previously described herein. More specifically, game screen 500 represent the example illustrated in FIG. 5I, which includes three winning combinations of persistent game indicators (e.g., persistent game indicators 529) in game reels 502A, 503B and 502E. The bonus display 5 can display a number of bonus display areas 605A, 605B, and 605C displaying to different bonus awards. In some implementations, the bonus awards can be predetermined fixed values. In other implementations, the bonus awards are variable values that can be progressively accumulated from one or more gaming systems (e.g., gaming systems 10 in banks 7).

In some implementations, the bonus display areas 605A, 605B, and 605C can be provided on a display of the gaming system 10 (e.g., display 130 or display 134). For example, the bonus display areas 605A, 605B, and 605C of the bonus display 5 can be repeated on an upper display area (e.g., display device 130) positioned above a display area (e.g., display device 120) displaying the game screen 500. The game reels 502 including winning combinations of persistent game indicators (e.g., persistent game indicators 529) can be visibly linked to respective one of the bonus display areas 605A, 605B, and 605C by one or more bonus link symbols 609 indicating a correspondence between a particular game reels 502 and a corresponding one of the bonus display areas 605A, 605B, and 605C. For example, game reels 502A, 502B and 502E include winning combinations of persistent game indicators, which can be linked by three bonus link symbols 609A, 609B, 609C to a third bonus display area 605C displaying a third bonus award value (e.g., $75.00).

FIGS. 7A-7E show example images of a game screen 700 displayed by a gaming system (e.g., gaming system 10) in accordance with aspects of the present disclosure. More specifically, FIGS. 7A-7E illustrate examples of screen shots of the game screen 700 that may be displayed by a display device (e.g., display device 120) by an implementation of the gaming system encompassed by the method illustrated in FIGS. 4A-4D. The game screen 700 includes game reels 702A-702E, symbol display areas 710A-710O, and spin count indicator 728, which may be the same to those previously described herein with regard to FIGS. 5A-5I (e.g., game screen 500, game reels 502A-502E, symbol display areas 510A-510O, and spin count indicator 528). The screen shots illustrated in FIGS. 7A-7E are similar to those previously described in FIGS. 5E-5I and, in some implementations, may be triggered from game symbols such as illustrated in the screen shot shown in FIG. 5C (e.g., as previously described with regard to blocks 401 to blocks 425 in FIGS. 4A and 4B). That is, as previously detailed herein, trigger symbols (e.g., bonus trigger symbols 513 in game reel 502A) may trigger a bonus game having ten spins (e.g., rounds), as indicated by a spin indicator 725 in FIG. 7A. It is understood, however, that in some implementations the screen shots illustrated in FIGS. 7A-7E may represent a standalone game not triggered by triggering symbols, rather than a bonus game.

Figure 7A:
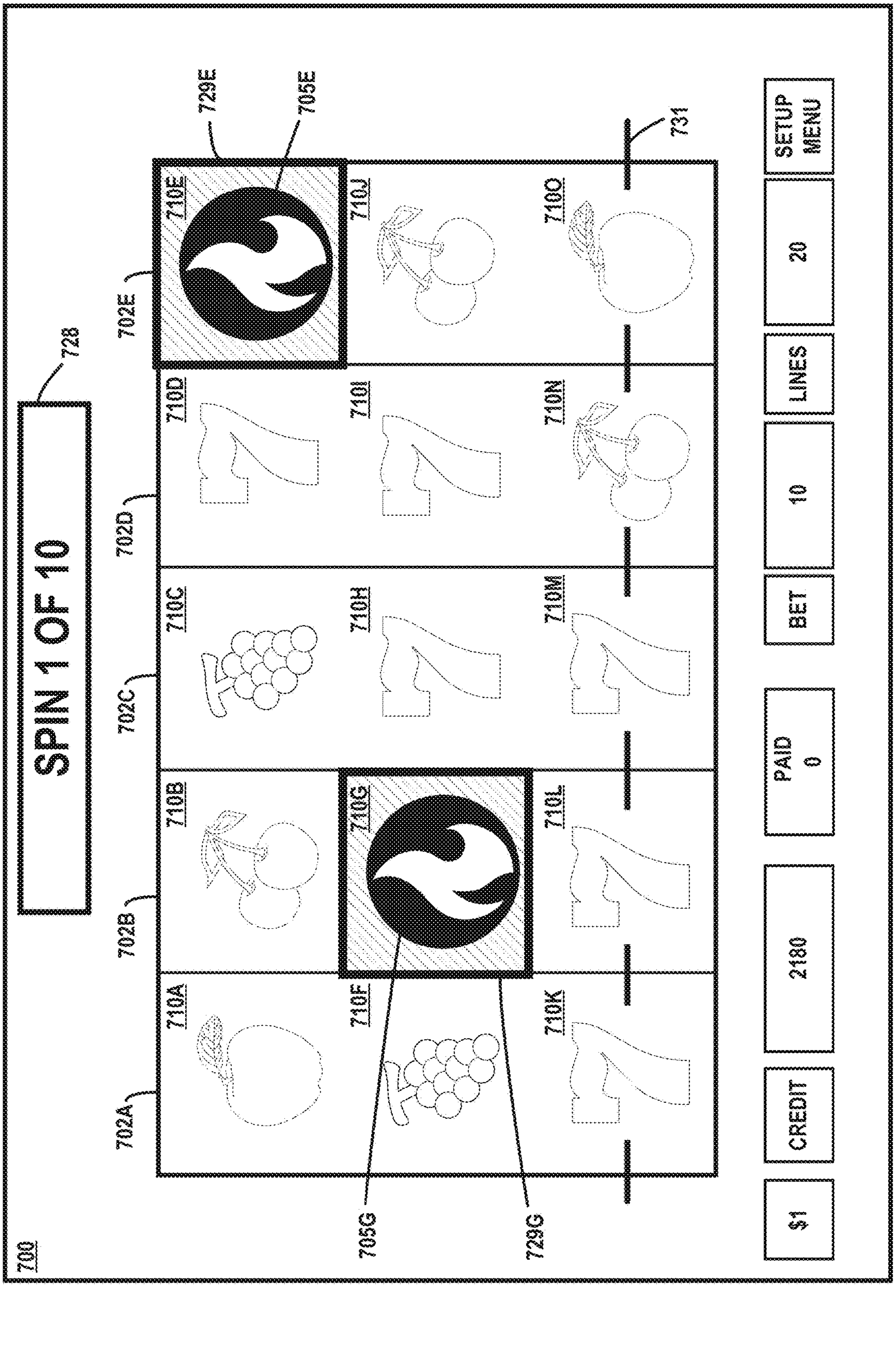
FIG. 7A shows a picture of a game screen displayed by a gaming system in accordance with aspects of the present disclosure.

As illustrated in FIG. 7A, the gaming system can display game symbols for the bonus game in the symbol display areas 710A-710O of the game reels 702A-702E for a first round of the bonus game ("Spin 1 of 10"). The gaming system can randomly determine game symbols from sets of game symbols corresponding to the reels 702A-702E (such as described with regard to block 433 in FIG. 4B) and display the game symbols in the symbol display areas 710A-710O (such as previously described with regard to block 435 in FIG. 4B). Further, the gaming system can evaluate the game symbols determined for the reels 702A-702E for winning symbol combinations (such as described with regard to block 443 in FIG. 4C), as previously described herein.

Figure 7B:
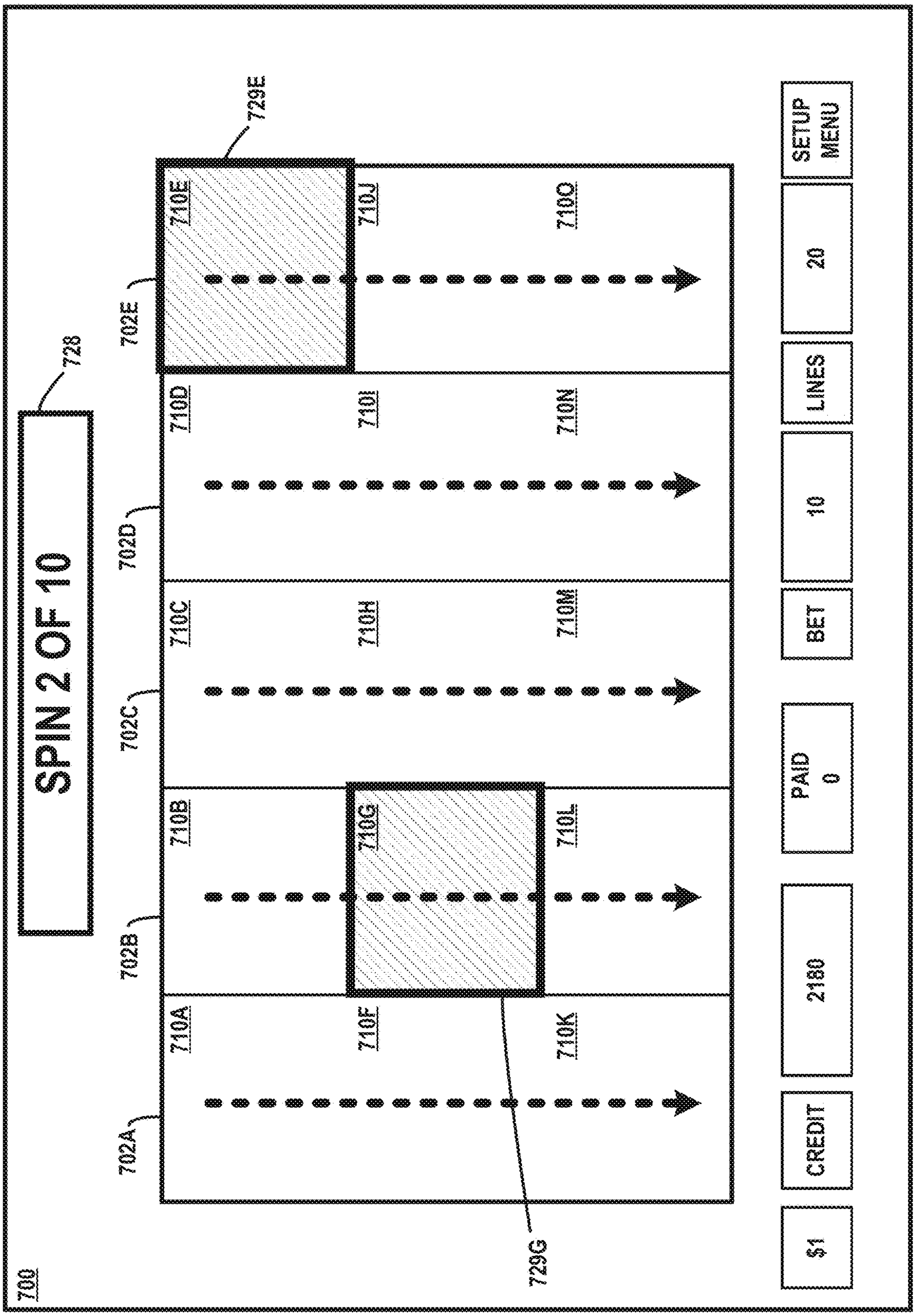
FIG. 7B shows a picture of a game screen displayed by a gaming system in accordance with aspects of the present disclosure.

In accordance with aspects of the present disclosure, the sets of game symbols can include predetermined symbols corresponding to persistent game indicators. Accordingly, the gaming system can determine and display persistent game indicators in the symbol display areas 710A-710O corresponding to such predetermined symbols. For example, as illustrated in FIG. 7A, the gaming system can generate and display persistent game indicators 729E and 729G when "Fire" game symbols 705E and 705G are generated in symbol display areas 710E and 710G. As previously described herein, the persistent game indicators 729E and 729G can remain locked in the symbol display areas from round-to-round, while the game symbols in the corresponding symbol display areas may be replaced from round-to-round. It is understood that implementations of the gaming system can use symbols other than the Fire symbols As illustrated in FIG. 7B, the gaming system can initiate a second round ("Spin 2 of 10") of the bonus game ("Spin 2 of 10") prior to displaying the symbols for the second round in the symbol display areas 710A-710O, the gaming system may cause the game screen 700 to display the reels 702A-702E spinning for a second round of the bonus game, as represented by the dashed lines in FIG. 7B, the gaming system may show a display of spinning reels for each of the reels 702A-702E, in a same or similar manner to that described above with regard to FIG. 5B. Additionally, the gaming system can display their spin count indicator 728 displaying count of the current round in the maximum quantity of round (e.g., "Spin 2 of 10"), as previously described herein. Further, while the game reels 702A-702E are spinning, the gaming system can cause the screen 700 to display the persistent game indicators 729E and 729G in their respective symbol display areas 710E and 710G, representing that such indicators are locked in position from round-to-round (e.g., from spin 1 to spin 2).

Figure 7C:
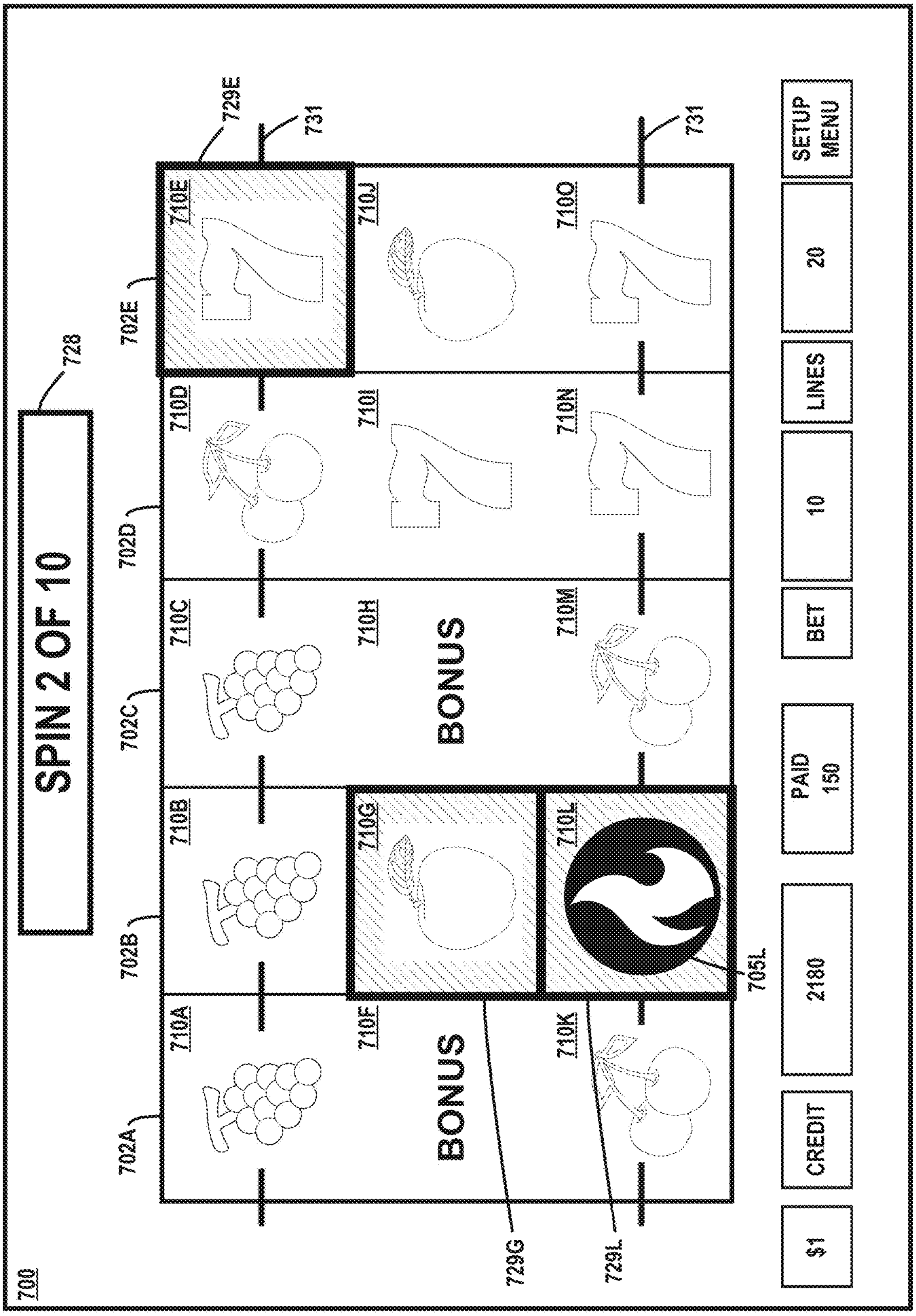
FIG. 7C shows a picture of a game screen displayed by a gaming system in accordance with aspects of the present disclosure.

As illustrated in FIG. 7C, the gaming system can determine, display, and evaluate game symbols displayed in the symbol display areas 710A-710O for a second round the bonus game, as previously described herein. Additionally, the gaming system determines and displays one or more persistent game indicators for the second round of the bonus game in a same manner as described above with regard to FIG. 7A. For example, in FIG. 7C, additional persistent game indicator 729L, determined for the second spin, is displayed at symbol display area 710L, in addition to persistent game indicators 729E and 729G, which are locked at symbol display areas 710E and 710G from the previous spin of the bonus game. In some implementations, the "Fire" symbol 705L may act as a wild symbol such that, in combination with "Cherry" symbols in symbol display areas 710K and 710M provide a winning combination along pay lines 731.

Figure 7D:
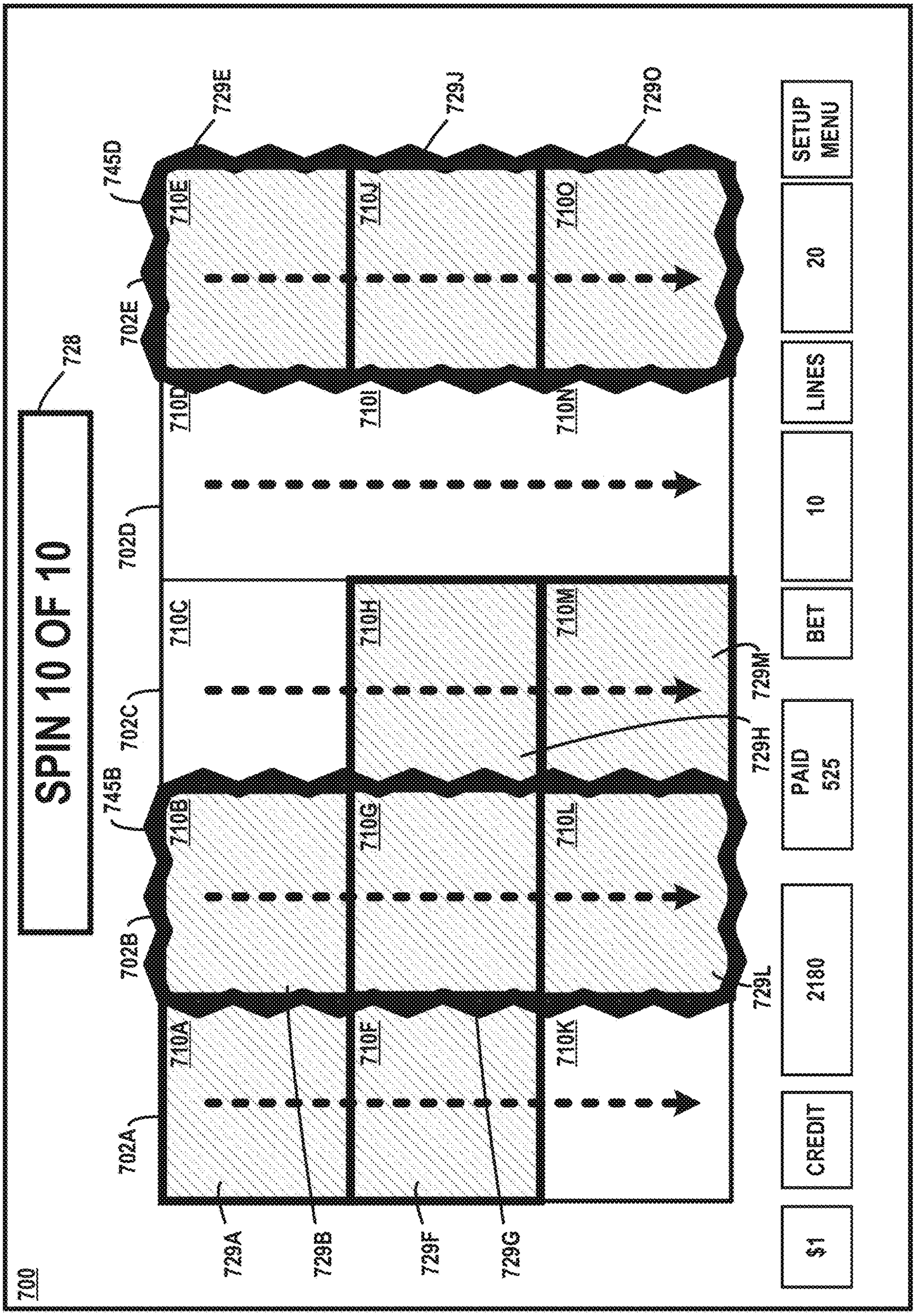
FIG. 7D shows a picture of a game screen displayed by a gaming system in accordance with aspects of the present disclosure.

In the same manner to that described with regard to FIGS. 7A-7C, the gaming system may iteratively repeat a number of rounds of the bonus game up to the maximum quantity of rounds determined for the bonus game. Over the number of rounds of the bonus game, the game may accumulate additional awards from winning combinations of game symbols. As illustrated in FIG. 7D, the spin count indicator 728 shows the current round is the tenth round of ten rounds of the bonus game ("Spin 10 of 10"), wherein additional persistent game indicators 729A, 729B, 729F, 729H, 729J, 729M, and 729O locked in symbol display areas 710A, 710B, 710F, 710J, 710M, and 710O have accumulated during rounds 3-9 of the bonus game (not shown) in addition to persistent game indicators 729E, 729G, and 729L which were locked at symbol display areas 710E, 710G, and 710L during the first two rounds of the bonus game. For the tenth round of the bonus game, prior to displaying the symbols for the tenth round in the symbol display areas 710A-710O, the gaming system may again cause the game screen 700 to display the reels 702A-702E spinning for tenth round of the bonus game, as represented by the dashed lines in FIG. 7D, the gaming system may show a display of spinning reels for each of the reels 702A-702E, in a same or similar manner to that described above with regard to FIG. 5B. Additionally, the gaming system can display the spin count indicator 728 displaying count of the current round in the awarded quantity of rounds of the bonus game (e.g., "Spin 10 of 10"). While the game reels 702A-702E are spinning, the gaming system can cause the screen 700 to display the persistent game indicators 729A, 729B, 729E, 729F, 729G, 729H, 729J, 729L, 729M, and 729O in their respective symbol display locations, representing that such indicators were locked in position from round-to-round (e.g., from spins 1-9), while the game symbols were replaced from round-to-round.

Further, as illustrated in FIG. 7D, the gaming system can indicate winning sequences of persistent game indicators in adjacent symbol display areas using a single persistent game indicator corresponding to the several symbol display areas. As discussed previously, some implementations of the gaming system provide a bonus award in the event that one or more of the game reels 702A-702E include a sequence of three or more persistent game indicators in single game reel (e.g., all symbol display areas of a single game reel). Such event is illustrated in FIG. 7D in which symbol display areas 710B, 710G, and 710L of game reel 702B include a winning sequence of persistent game indicators 729B, 729G, and 729L, as indicated by separate persistent sequence indicator 745B. Likewise, symbol display areas 710E, 710J, and 710O of game reel 702E include a winning sequence of persistent game indicators 729E, 729J, and 729O, as indicated by separate persistent sequence indicator 745E. It is understood that the game reels 702A-702E can comprise a greater number of rows (e.g., five instead of three, or other suitable value) and that in various implementations, the gaming system can determine a winning sequence of the persistent game indicators when some portion of the rows (e.g., three or four rows) or when all rows (e.g., five) include winning sequences of persistent game indicators.

Figure 7E:
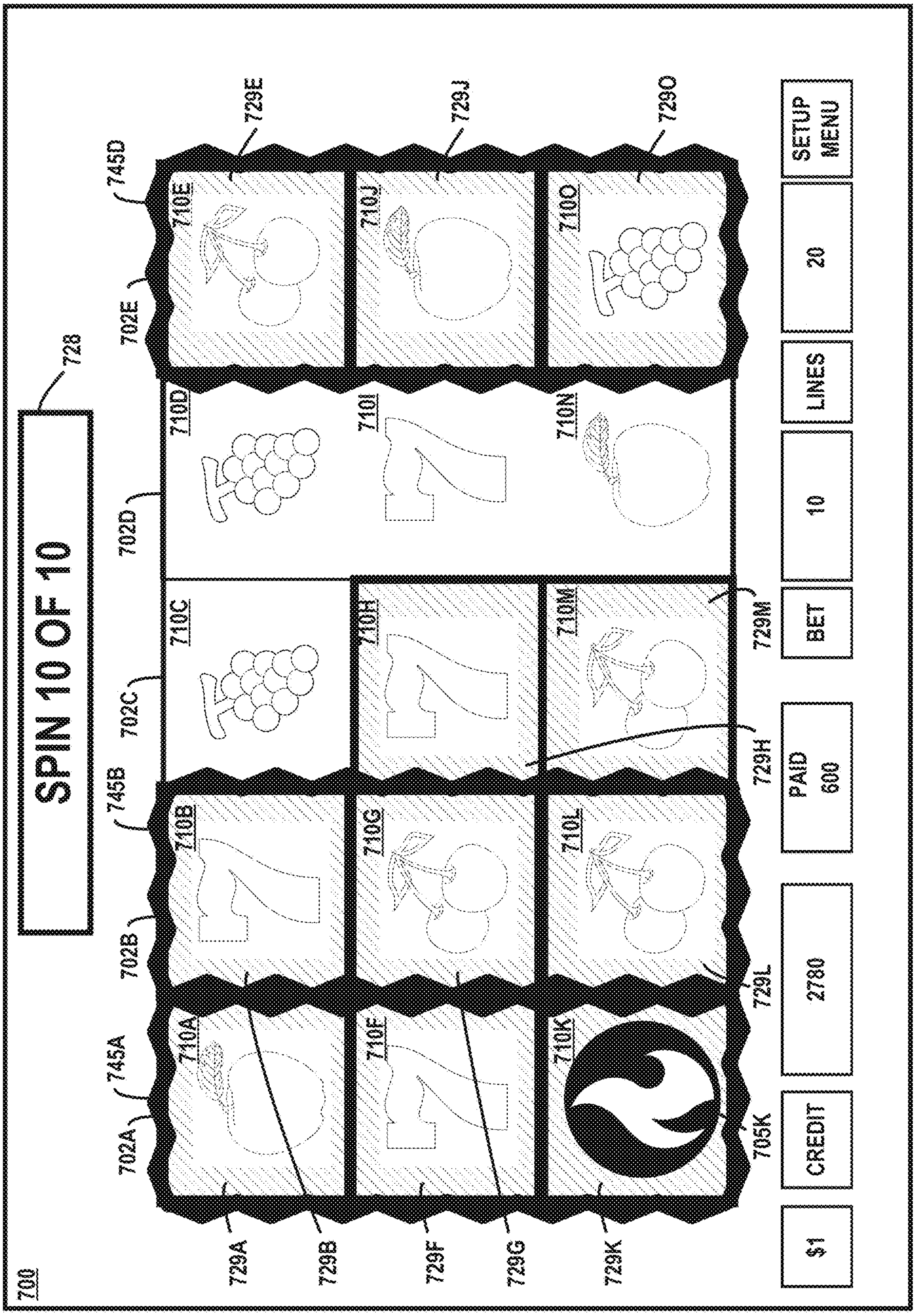
FIG. 7E shows a picture of a game screen displayed by a gaming system in accordance with aspects of the present disclosure.

As illustrated in FIG. 7E, the gaming system can determine, display, and evaluate game symbols in the symbol display areas 710A-710O for tenth round the bonus game in a same manner as described above with regard to FIG. 7C. Additionally, the gaming system may determine and display one or more persistent game indicators for the tenth round of the bonus game as described above. For example, in FIG. 7E, a new persistent bonus indicator 729K determined for the tenth round is displayed at symbol display area 710K, in addition to persistent game indicators 729A, 729B, 729E, 729F, 729G, 729H, 729J, 729L, 729M, and 729O, which were locked at symbol display areas 710A, 710B, 710E, 710F, 710G, 710J, 710L, 710M, and 710O from the previous rounds of the bonus game. And, in accordance with implementations consistent with the present disclosure, the persistent bonus indicator 729K is a third persistent game indicator that fills reel 702A along with persistent symbol indicators 729A and 729F. Accordingly, the gaming system can display an additional persistent sequence indicator 745A indicating the winning sequence of persistent game indicators 729A, 729F, and 729K in game reel 702.

As the tenth round is the maximum round of the bonus game, the gaming system may evaluate the persistent game indicators 729A, 729B, 729E, 729F, 729G, 729H, 729J, 729L, 729M, and 729O and the persistent sequence indicators 745A, 745B, and 745E in the symbol display areas 710A-710O to determine a persistent indicator bonus award (e.g., as previously described with regard to block 457 in FIG. 4C.). In some implementations, the gaming system can determine the persistent indicator bonus award based on the quantity or arrangement of the persistent game indicators 729A, 729B, 729E, 729F, 729G, 729H, 729J, 729L, 729M, and 729O. For example, as illustrated in FIG. 7E and indicated by persistent sequence indicators 745A, 745B and 745E, reels 702A, 702B, 702E each have their respective symbol display areas filled with persistent game indicators, which may correspond to an additional award (e.g., a progressive jackpot award as shown in FIG. 6), previously detailed herein. Also, individual persistent game indicators (e.g., not members of a winning sequence of the persistent game indicators), such as persistent game indicators 729H and 729M, can each provide an award.

Based on the forgoing description, it should be appreciated that a gaming system and method with improvements to game outcomes by unlocking additional symbols creates new and very exciting ways for a player to obtain improved winnings with a potential to earn greater awards. Such a potential to earn greater awards creates a greatly improved sense of anticipation for players.

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular implementations only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

A number of implementations of the invention have been described. Various modifications may be made without departing from the spirit and scope of the invention. For example, various forms of the flows shown above may be used, with steps re-ordered, added, or removed. Accordingly, other implementations are within the scope of the following claims.

We claim:

1. A gaming system comprising:
- a processor;
- a random number generator;
- a display device;
- an input device; and
- a dispenser;
- a memory device that stores program instructions that, when executed by the processor, cause the gaming system to:
  - initiate a first round of a plurality of rounds of a game;
  - determine, using the random number generator, a first plurality of game symbols for a plurality of symbol display areas using one or more first symbol sets;
  - display, using the display device, the first plurality of game symbols in the plurality of symbol display areas;
  - determine, using the random number generator, first persistent game indicators for first symbol display areas of the plurality of symbol display areas using one or more symbol sets that are different than the one or more first symbol sets;
  - display, using the display device, the first persistent game indicators in the first symbol display areas;
  - determine first winning symbol combinations based on the first plurality of game symbols displayed in the plurality of symbol display areas;
  - initiate a second round of the plurality of rounds of the game;
  - determine, using the random number generator, a second plurality of game symbols for the plurality of symbol display areas using the one or more first symbol sets;
  - display, using the display device, the second plurality of game symbols in the plurality of symbol display areas in replacement of the first plurality of game symbols in the plurality of symbol display areas;
  - determine, using the random number generator, second persistent game indicators for second symbol display areas of the plurality of symbol display areas using one or more symbol sets that are different than the one or more first symbol sets;
  - display, using the display device, the second persistent game indicators in the second symbol display areas in addition to the first persistent game indicators in the first symbol display areas;
  - determine second winning symbol combinations based on the second plurality of game symbols displayed in the plurality of symbol display areas;
  - determine a game award based on the first winning symbol combinations, the second winning symbol combinations, and a combination of the first persistent game indicators and the second persistent game indicators in the plurality of symbol display areas; and
  - issue value from the dispenser based on the game award.

2. The gaming system of claim 1, wherein:
- the game comprises a bonus game; and
- initiating the first round of the plurality of rounds, comprises:
  - initiating a base game
  - determining, using the random number generator, a plurality of base game symbols for the plurality of symbol display areas;
  - displaying, using the display device, the plurality of base game symbols in the plurality of symbol display areas; and
  - determining that the displayed plurality of base game symbols trigger the bonus game.

3. The gaming system of claim 2, wherein the program instructions further cause the gaming system to:
- determine winning base game symbol combinations based on the plurality of base game symbols displayed in the plurality of symbol display areas; and
- determine a base game award based on the winning base game symbol combinations.

4. The gaming system of claim 2, wherein the program instructions further cause the gaming system to:
- determine a maximum quantity of rounds included in the plurality of rounds based on a wager.

5. The gaming system of claim 2, wherein the program instructions further cause the gaming system to:

determine a maximum quantity of rounds included in the plurality of rounds based on the displayed plurality of base game symbols.

6. The gaming system of claim 1, wherein:

the plurality of rounds includes one or more additional rounds; and the one or more additional rounds comprises the following operations:

determining, using the random number generator, an additional plurality of game symbols for the plurality of symbol display areas;

displaying, using the display device, the additional plurality of game symbols in the plurality of symbol display areas;

determining, using the random number generator, additional persistent game indicators for additional symbol display areas of the plurality of symbol display areas;

displaying, using the display device, the additional persistent game indicators in the additional symbol display areas;

determining additional winning symbol combinations based on the additional plurality of game symbols displayed in the plurality of symbol display; and determining an additional game award based on the winning symbol combinations of the additional plurality of game symbols.

7. The gaming system of claim 6, wherein determining the game award comprises:

determining winning persistent combinations based on the first game persistent indicators, the second persistent game indicators, and the additional persistent game indicators.

8. The gaming system of claim 6, wherein:

the plurality of symbol display areas are arranged in a plurality of columns representing a plurality of game reels;

individual columns of the plurality of columns include three or more symbol display areas of the plurality of symbol display areas; and determining the game award comprises determining that at least the three or more symbol display areas, included in one or more individual columns of the plurality of columns, display persistent game indicators of the first persistent game indicators, the second persistent game indicators, or the additional persistent game indicators.

9. The gaming system of claim 8, wherein determining the game award comprises:

determining that a first column of the plurality of columns filled with persistent indicators corresponds to a first award;

determining that the first column and a second column of the plurality of columns filled with persistent indicators corresponds to a second award; and determining that the first column, the second column, and a third column of the plurality of columns filled with persistent indicators corresponds to a third award.

10. The gaming system of claim 1, wherein the program instructions further cause the gaming system to:

receive, using a network interface via a communication link, a value of the game award from a bonus server.

11. A method of operating a gaming system, the method comprising:

initiating, by the processor, a first round of a plurality of rounds of a game;

determining, by the processor using a random number generator, a first plurality of game symbols for a plurality of symbol display areas;

displaying, by the processor using a display device, the first plurality of game symbols in the plurality of symbol display areas;

determining, by the processor using the random number generator, first persistent game indicators for first symbol display areas of the plurality of symbol display areas;

displaying, by the processor using the display device, the first persistent game indicators in the first symbol display areas;

determining, by the processor, first winning symbol combinations based on the first plurality of game symbols displayed in the plurality of symbol display areas;

initiating, by the processor, a second round of the plurality of rounds of the game;

determining, by the processor using the random number generator, a second plurality of game symbols for the plurality of symbol display areas;

displaying, by the processor using the display device, the second plurality of game symbols in the plurality of symbol display areas in replacement of the first plurality of game symbols in the plurality of symbol display areas;

determining, by the processor using the random number generator, second persistent game indicators for second symbol display areas of the plurality of symbol display areas;

displaying, by the processor using the display device, the second persistent game indicators in the second symbol display areas in addition to the first persistent game indicators in the first symbol display areas;

determining, by the processor, second winning symbol combinations based on the second plurality of game symbols displayed in the plurality of symbol display areas;

determining, by the processor, a game award based on the first winning symbol combinations, the second winning symbol combinations, and a combination of the first persistent game indicators and the second persistent game indicators in the plurality of symbol display areas;

wherein:

determining the first plurality of game symbols comprises determining the first plurality of game symbols using one or more first symbol sets, determining the second plurality of game symbols comprises determining the second plurality of game symbols using the one or more first symbol sets, and determining the first persistent indicators and the second persistent indicators comprising determining the first persistent indicators and the second persistent indicators using one or more symbol sets that are different than the one or more first symbol sets; and issuing, by the processor, value from a dispenser based on the game award.

12. The gaming system of claim 11, wherein:

the game comprises a bonus game; and initiating the first round of the plurality of rounds, comprises:

initiating a base game determining, using the random number generator, a plurality of base game symbols for the plurality of symbol display areas;

displaying, using the display device, the plurality of base game symbols in the plurality of symbol display areas; and determining that the displayed plurality of base game symbols trigger the bonus game.

13. The method of claim 12, further comprising:

determining winning base game symbol combinations based on the plurality of base game symbols displayed in the plurality of symbol display areas; and determining a base game award based on the winning base game symbol combinations.

14. The method of claim 12, further comprising:

determining a maximum quantity of rounds included in the plurality of rounds based on a wager.

15. The method of claim 12, further comprising:

determining a maximum quantity of rounds included in the plurality of rounds based on the displayed plurality of base game symbols.

16. The method of claim 11, wherein:

the plurality of rounds includes one or more additional rounds; and the one or more additional rounds comprises:

determining, using the random number generator, an additional plurality of game symbols for the plurality of symbol display areas;

displaying, using the display device, the additional plurality of game symbols in the plurality of symbol display areas;

determining, using the random number generator, additional persistent game indicators for additional symbol display areas of the plurality of symbol display areas;

displaying, using the display device, the additional persistent game indicators in the additional symbol display areas;

determining additional winning symbol combinations based on the additional plurality of game symbols displayed in the plurality of symbol display; and determining an additional game award based on the winning symbol combinations of the additional plurality of game symbols.

17. The method of claim 16, wherein determining the game award comprises:

determining winning persistent combinations based on the first game persistent indicators, the second persistent game indicators, and the additional persistent game indicators.

18. The method of claim 16, wherein:

the plurality of symbol display areas are arranged in a plurality of columns representing a plurality of game reels;

individual columns of the plurality of columns include three or more symbol display areas of the plurality of symbol display areas; and determining the game award comprises determining that all of the three or more symbol display areas, included in one or more individual columns of the plurality of columns, display persistent game indicators of the first persistent game indicators, the second persistent game indicators, or the additional persistent game indicators.

19. The method of claim 18, wherein determining the game award comprises:

determining that a first column of the plurality of columns filled with persistent indicators corresponds to a first award;

determining that the first column and a second column of the plurality of columns filled with persistent indicators corresponds to a second award; and determining that the first column, the second column, and a third column of the plurality of columns filled with persistent indicators corresponds to a third award.

20. A non-transitory computer-readable storage device having program instructions stored therein, the program instructions being executable by a processor to cause a gaming system to:

initiate a first round of a plurality of rounds of a game;

determine, using a random number generator, a first plurality of game symbols for a plurality of symbol display areas using one or more first symbol sets;

display, using a display device, the first plurality of game symbols in the plurality of symbol display areas;

determine, using the random number generator, first persistent game indicators for first symbol display areas of the plurality of symbol display areas using one or more symbol sets that are different than the one or more first symbol sets;

display, using the display device, the first persistent game indicators in the first symbol display areas;

determine first winning symbol combinations based on the first plurality of game symbols displayed in the plurality of symbol display areas;

initiate a second round of the plurality of rounds of the game;

determine, using the random number generator, a second plurality of game symbols for the plurality of symbol display areas using the one or more first symbol sets;

display, using the display device, the second plurality of game symbols in the plurality of symbol display areas in replacement of the first plurality of game symbols in the plurality of symbol display areas;

determine, using the random number generator, second persistent game indicators for second symbol display areas of the plurality of symbol display areas using one or more symbol sets that are different than the one or more first symbol sets;

display, using the display device, the second persistent game indicators in the second symbol display areas in addition to the first persistent game indicators in the first symbol display areas;

determine second winning symbol combinations based on the second plurality of game symbols displayed in the plurality of symbol display areas;

determine a game award based on the first winning symbol combinations, the second winning symbol combinations, and a combination of the first persistent game indicators and the second persistent game indicators in the plurality of symbol display areas; and issue value from a dispenser based on the game award.

* * * * *